(12) United States Patent
Warmath et al.

(10) Patent No.: US 10,685,269 B2
(45) Date of Patent: Jun. 16, 2020

(54) SYSTEMS AND METHODS FOR PREDICTING, IDENTIFYING, AND/OR CONFIRMING PRESENCE OF OBJECTS IN A PREDEFINED SPACE OR OTHERWISE ASSOCIATED WITH A CONTAINER

(71) Applicant: Dark Horse Solutions, LLC, Pewaukee, WI (US)

(72) Inventors: Dee A. Warmath, Pewaukee, WI (US); Kevin B. Ponto, Madison, WI (US); Randall E. Basso, San Martin, CA (US); Martin E. McGee, Kirkland, WA (US)

(73) Assignee: Dark Horse Solutions, LLC, Pewaukee, WI (US)

(*) Notice: Subject to any disclaimer, the term of this patent is extended or adjusted under 35 U.S.C. 154(b) by 0 days.

(21) Appl. No.: 15/893,970

(22) Filed: Feb. 12, 2018

(65) Prior Publication Data

US 2018/0165556 A1 Jun. 14, 2018

Related U.S. Application Data

(63) Continuation of application No. 15/256,414, filed on Sep. 2, 2016, now Pat. No. 9,892,352.

(60) Provisional application No. 62/214,289, filed on Sep. 4, 2015.

(51) Int. Cl.

| | | |
|---|---|---|
| *G06Q 30/00* | (2012.01) | |
| *G06K 17/00* | (2006.01) | |
| *G08B 13/14* | (2006.01) | |
| *G08B 13/24* | (2006.01) | |
| *G06K 7/10* | (2006.01) | |
| *G06K 19/07* | (2006.01) | |
| *G01S 13/74* | (2006.01) | |

(52) U.S. Cl.
CPC ..... *G06K 17/0022* (2013.01); *G06K 7/10376* (2013.01); *G06K 19/0723* (2013.01); *G08B 13/14* (2013.01); *G08B 13/24* (2013.01); *G01S 13/74* (2013.01)

(58) Field of Classification Search
CPC ....... G06Q 10/087; G06Q 10/08; G06Q 10/06
USPC ....................................... 235/385
See application file for complete search history.

(56) References Cited

U.S. PATENT DOCUMENTS

| | | | |
|---|---|---|---|
| 6,751,484 B1 | 6/2004 | Sandelius et al. | |
| 2008/0001746 A1 | 1/2008 | Childress et al. | |
| 2008/0204232 A1 | 8/2008 | Agrawal et al. | |
| 2010/0159986 A1 | 6/2010 | Lewis et al. | |
| 2010/0174759 A1 | 7/2010 | Piccinini et al. | |
| 2010/0295665 A1* | 11/2010 | Landau ................ | G06Q 10/087 340/10.42 |

(Continued)

OTHER PUBLICATIONS

International Search Report and Written Opinion of ISA, dated Dec. 1, 2016, regarding PCT application No. PCT/US 16/50279, 9 pages.

(Continued)

*Primary Examiner* — Ahshik Kim
(74) *Attorney, Agent, or Firm* — Smith Keane LLP

(57) ABSTRACT

Systems and methods for predicting, identifying, and/or confirming the presence of an object in a predefined space include communication between the object and a sensor having a detection range. The detection range of the sensor is limited to a predefined space or direction that may be less than its maximum detection range.

17 Claims, 15 Drawing Sheets

(56) References Cited

U.S. PATENT DOCUMENTS

| | | |
|---|---|---|
| 2010/0295796 A1 | 11/2010 | Roberts et al. |
| 2013/0172710 A1 | 7/2013 | Mears et al. |
| 2016/0055360 A1* | 2/2016 | Haugarth ........... G06Q 30/0201 340/10.1 |
| 2017/0242643 A1* | 8/2017 | Weiss .................... G06F 1/1628 |

OTHER PUBLICATIONS

Printout from https://www.kickstarter.com/projects/fstop/kitsentry, accessed Feb. 2, 2017, original date unknown.

* cited by examiner

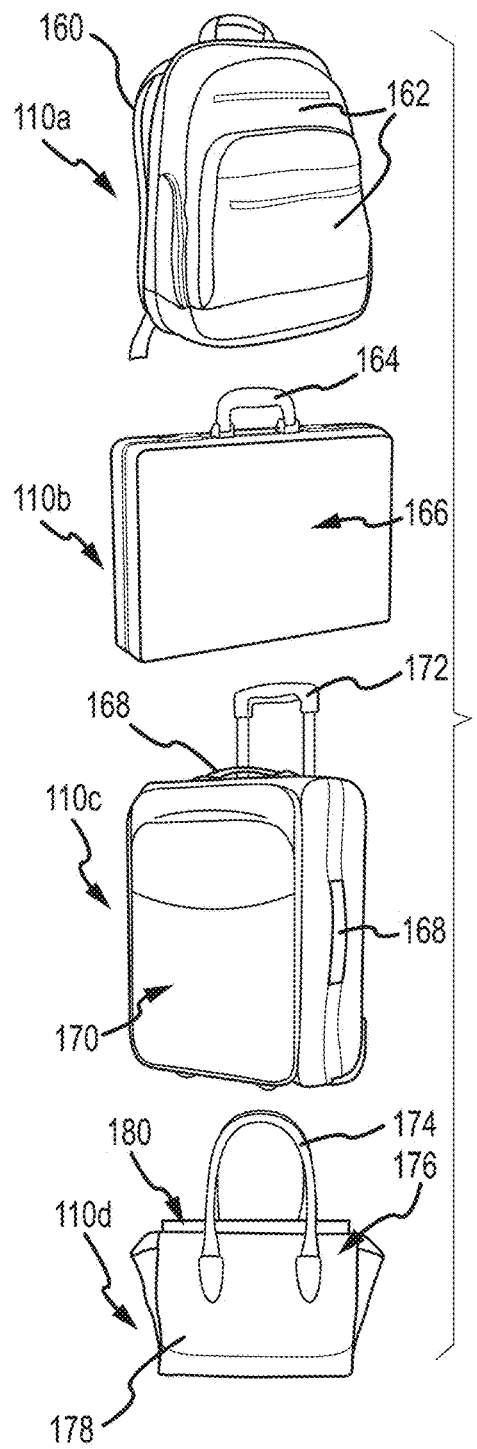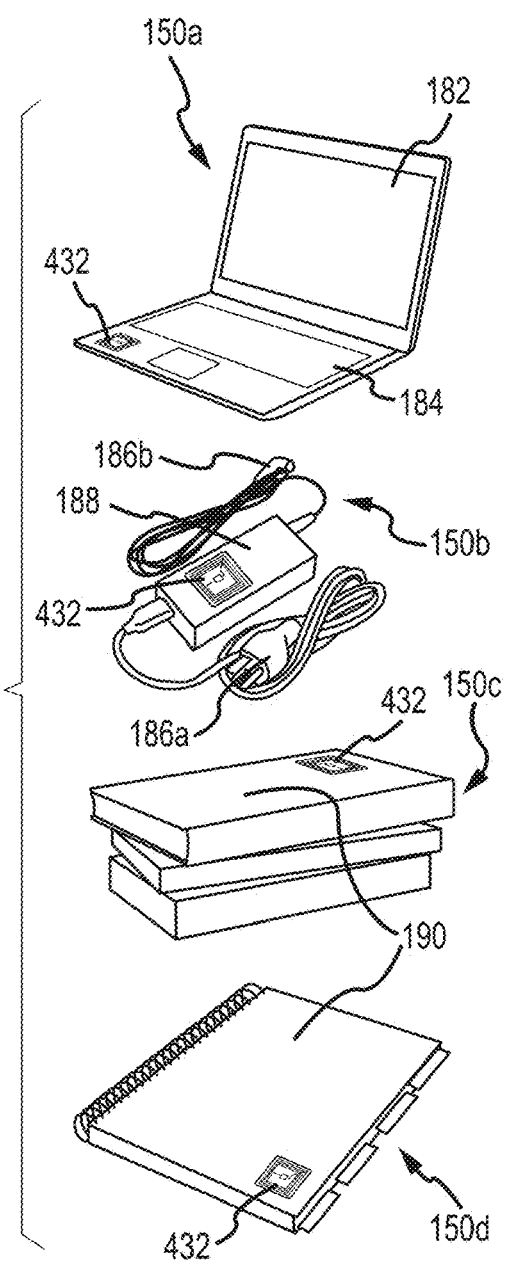

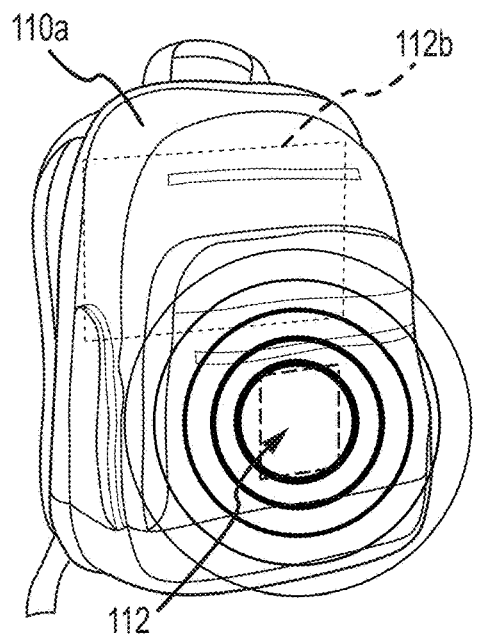
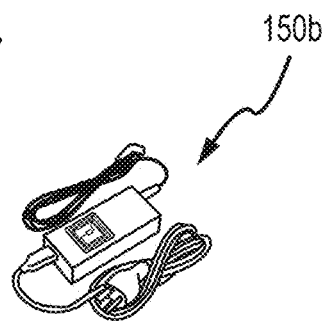
Fig.7
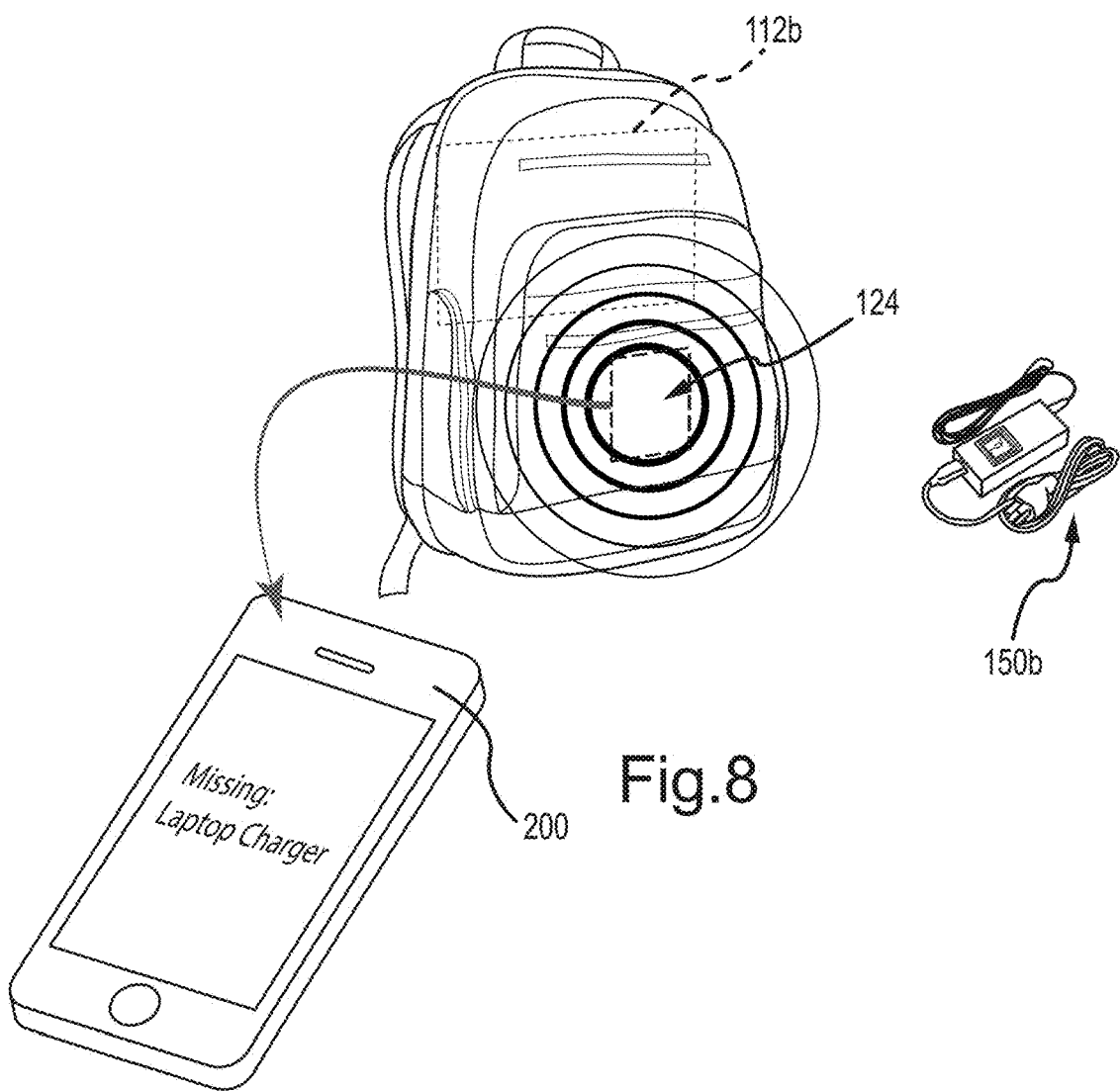
Fig.8

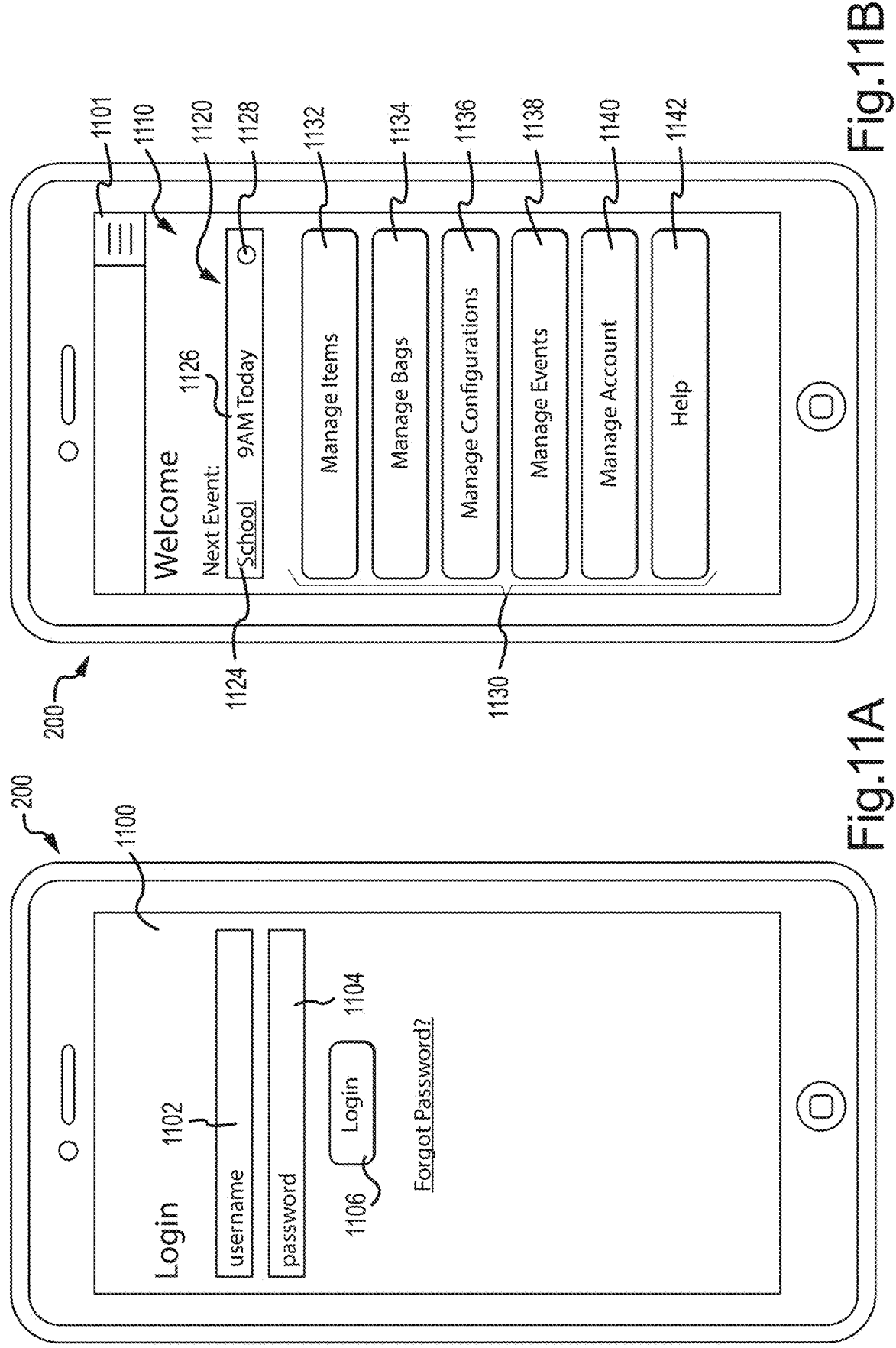

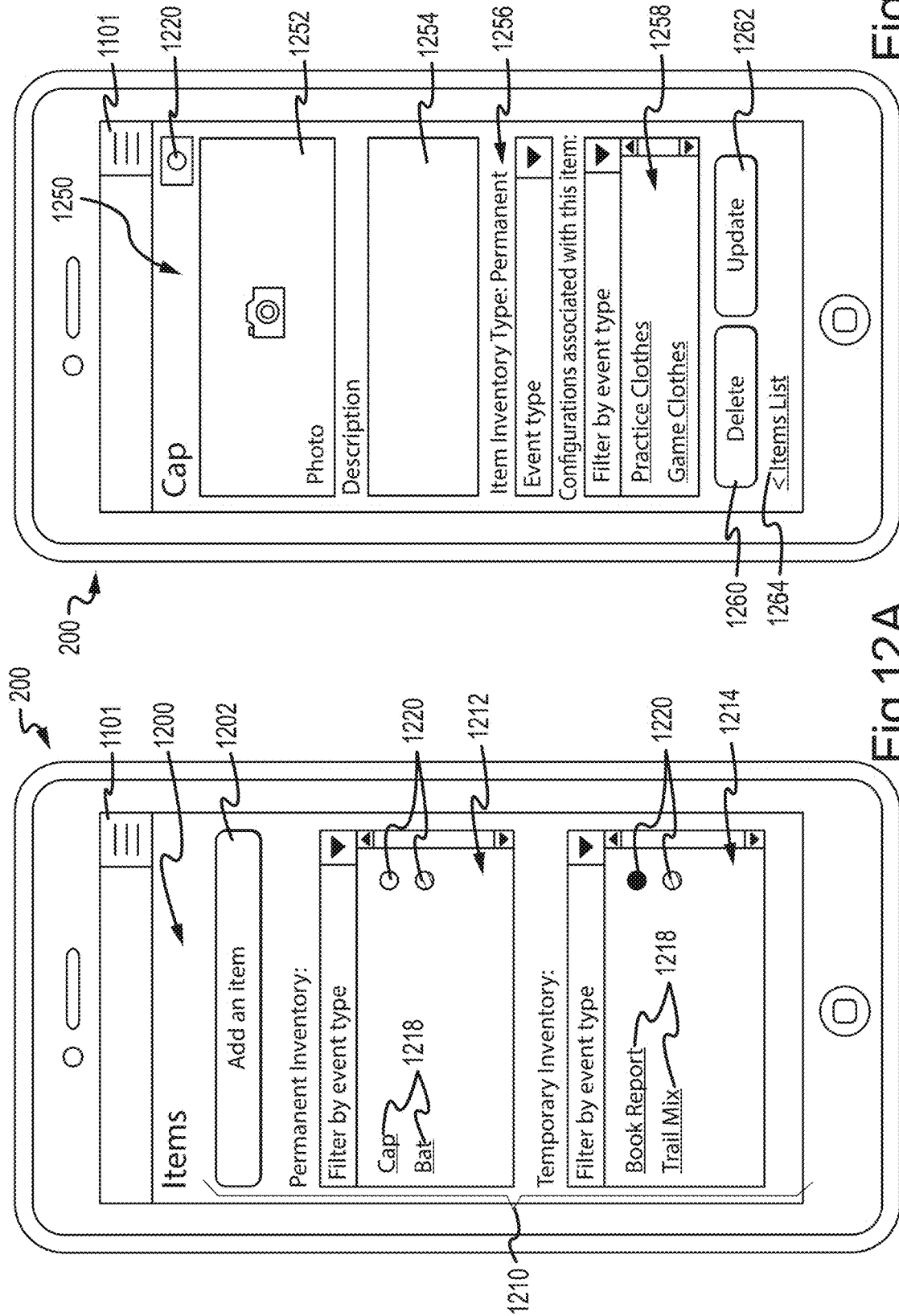

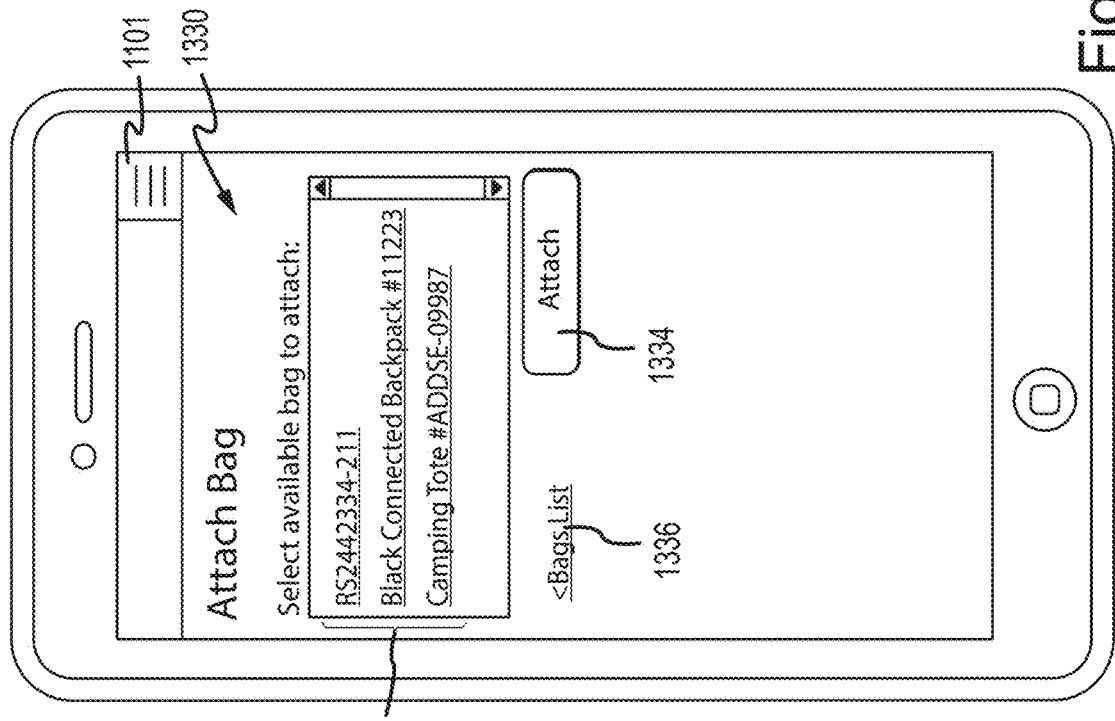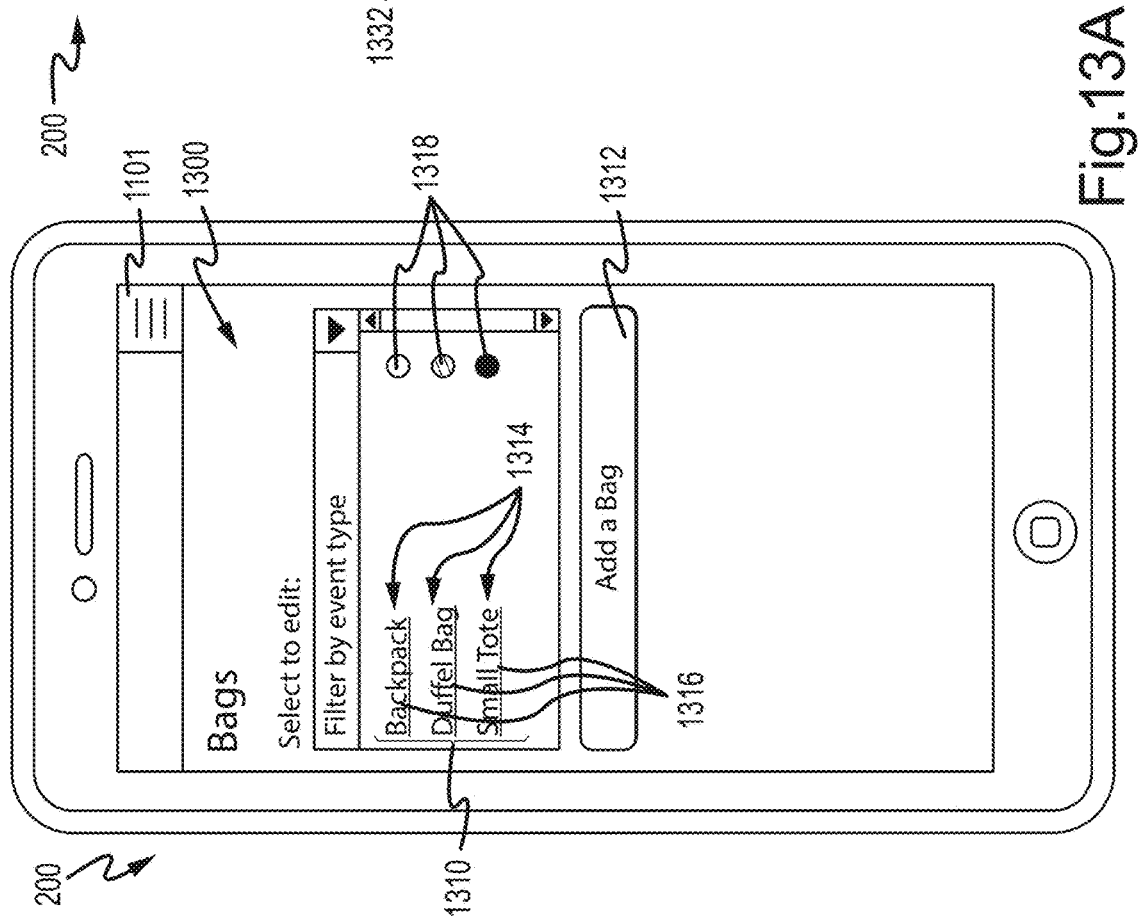

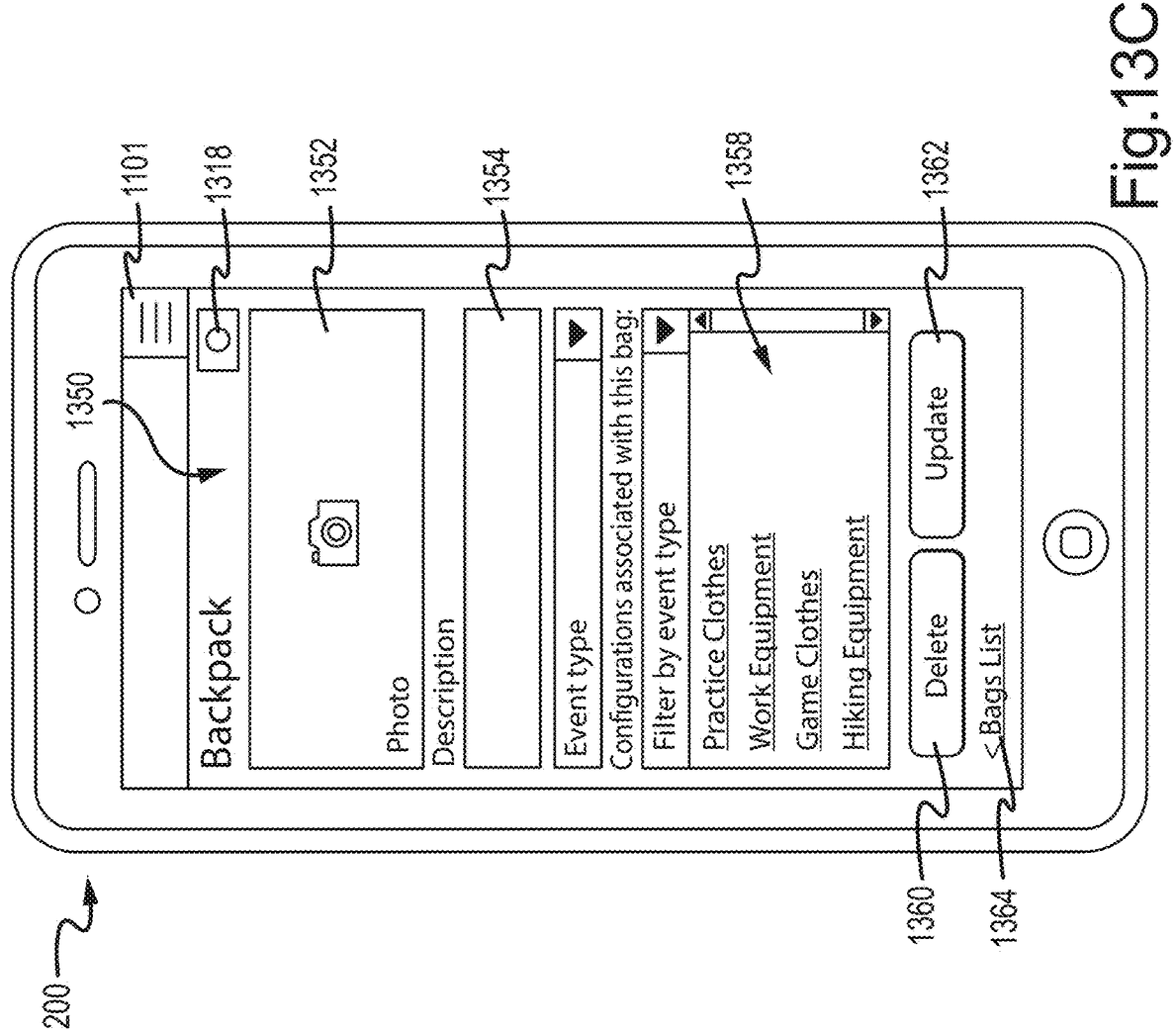

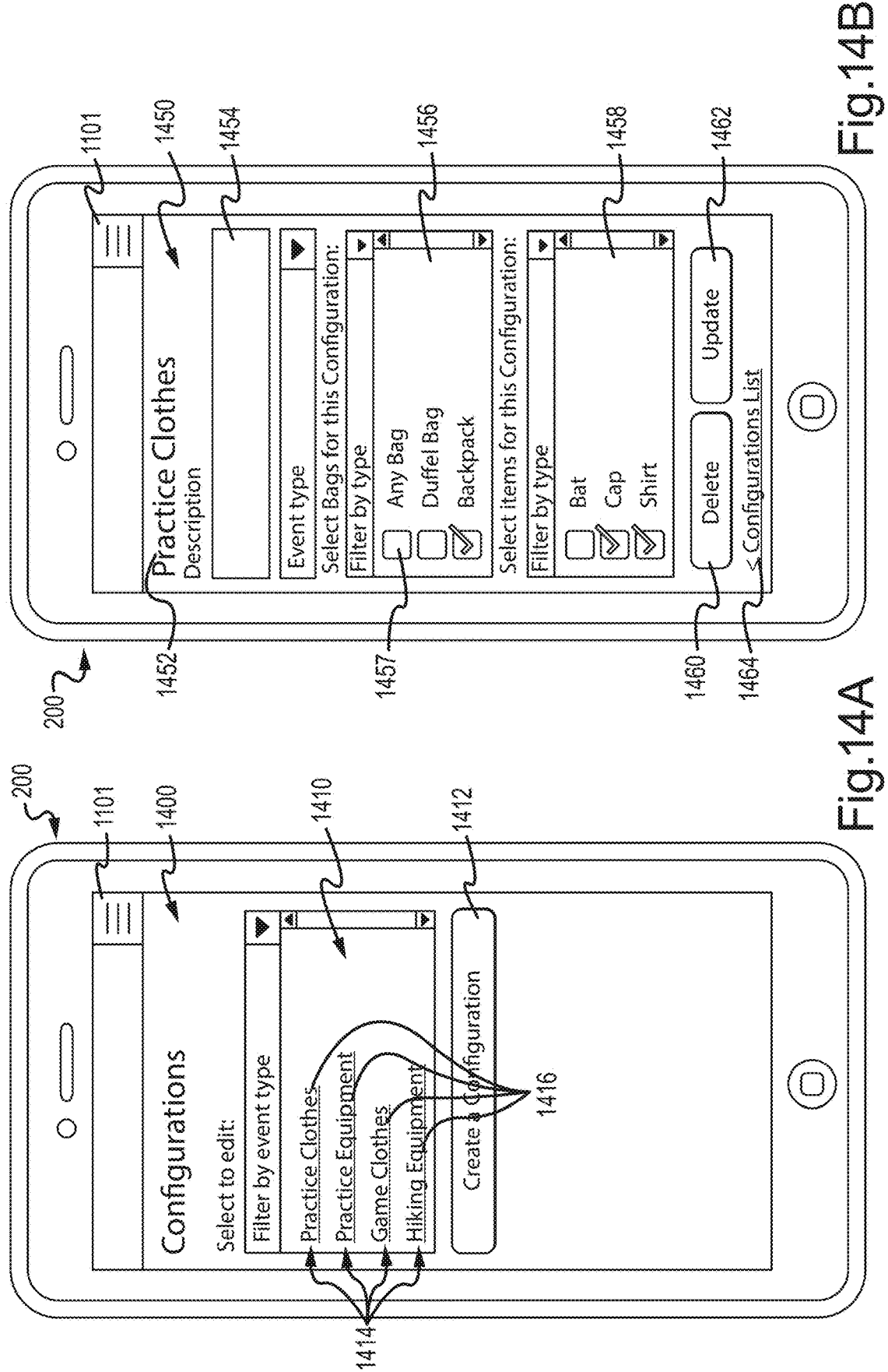

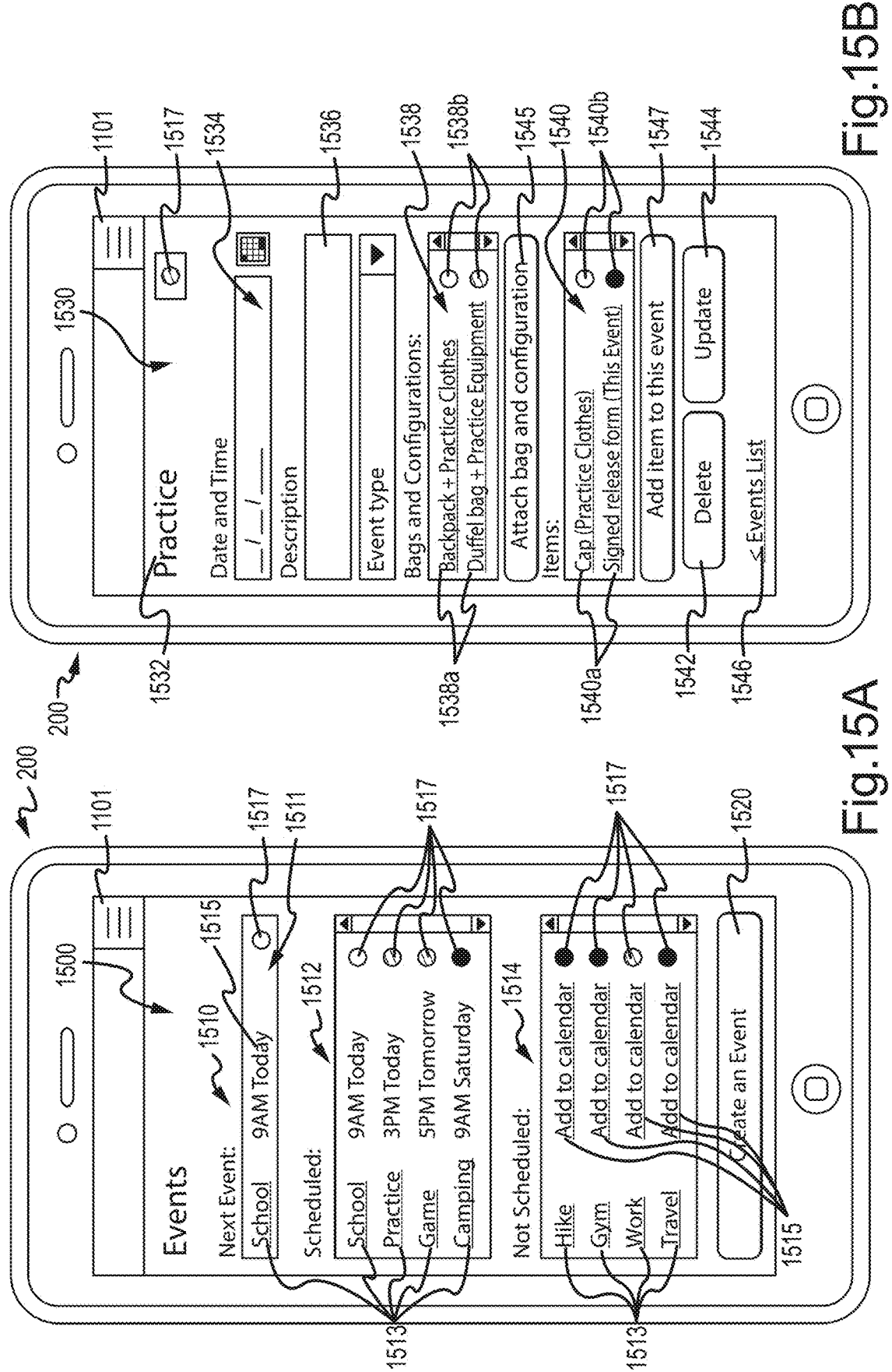

SYSTEMS AND METHODS FOR PREDICTING, IDENTIFYING, AND/OR CONFIRMING PRESENCE OF OBJECTS IN A PREDEFINED SPACE OR OTHERWISE ASSOCIATED WITH A CONTAINER

RELATED APPLICATIONS

This application claims the benefit of co-pending U.S. Non-Provisional patent application Ser. No. 15/256,414, filed 2 Sep. 2016, and entitled "Systems and Methods for Predicting, Identifying, and/or Confirming Presence of Objects in a Predefined Space," which claims a benefit to U.S. Provisional Patent Application Ser. No. 62/214,289, filed 4 Sep. 2015, and entitled "Systems and Methods for Predicting, Identifying, and/or Confirming Presence of Objects in a Predefined Space," both of which are incorporated herein by reference in their entireties.

BACKGROUND

This invention relates generally to the tracking or identification of objects, such as travel, work, and/or school accessories, and more particularly to systems and methods that may be used to review objects within a container and communicate with a person to inform them of the reviewed objects and/or to suggest that person place a missing object into the container.

Facing reality, people may at times be forgetful. Forgetfulness may be caused by any of one or more conditions, including emotional (e.g., stress), mental (e.g., multi-tasking, distraction), chemical (e.g., medication), and/or physiological (e.g., short-term memory loss from a stroke) conditions. As a result of forgetfulness, certain object storage or transport placement may not occur. For example, when preparing to travel, a person may forget to pack an item that they intended to transport. As a further example, a person may not place items for correct storage at home, such as in a refrigerator, freezer, or medicine cabinet. In an attempt to ensure that objects are located appropriately for a predetermined time, such as in a briefcase for a meeting, or to ensure timely return of medicine to a cabinet, a person may check, double-check, and even triple-check objects that have been packed or stored or not, as the case may be.

Regarding business travel, people desire to be prepared—to have everything with them, to be on top of things. If objects are not packed, it may result in a feeling of failure as a person arrives at his or her destination ill-prepared. Incomplete packing and/or storage makes for wasted trips or unnecessary purchases when a person may have to replace the item not packed or not stored/located. Such wasted trips and unnecessary purchases are generally inefficient and result in a loss of productivity.

The cognitive demands of today's busy world make object tracking and organization even more important. Therefore, the art of object organization and planning would benefit from improved systems and methods of predicting, identifying, and/or confirming a presence of an object in a predefined space.

SUMMARY OF THE INVENTION

The present invention relates to improved systems and methods of predicting, identifying, and/or confirming a presence of an object (item) in a predefined space or an associated container, such as a bag.

Systems and methods according to the present invention provide a virtual personal packing assistant that not only gives suggestions about what to pack for a particular time or event, but can assist in ensuring that the plan is executed at the appropriate time. These systems and methods utilize a user interface (e.g., an light emitting diode (LED), liquid crystal display (LCD) (e.g., mounted in a home, such as on a refrigerator or near an exit door), heads-up display (HUD) (e.g., in a vehicle), speaker, and/or buzzer) to indicate whether or not expected objects are represented as being located within the predefined space or associated with a container. If not, feedback is provided on a device (e.g., mobile phone, tablet or other computer, and/or on the user interface to see what is missing.

Systems and methods according to the present invention may be used by a variety of persons for a variety of applications. Outdoor applications may include packing for a daytrip or hike, a picnic, a hunting or fishing trip, or even a mountaineering expedition. Educational applications may include packing for classes and/or extracurricular activities that may change from day to day. Business applications include packing a briefcase or other bag (e.g., backpack, purse, etc.) for a day's work. Business applications may also include packing a toolbox or bag, and/or service truck for mobile job applications (e.g., handyman, contractor, firefighter, etc.). Home applications include packing a diaper bag, packing children's bags/lunch boxes for school, shelf or closet storage, refrigerator/freezer monitoring, and/or medicine cabinet monitoring. Travel applications include packing a suitcase or bag for a daytrip, overnight trip, or multiple day trip to a single destination or multiple destinations for business or leisure. Athletic applications include packing a sports bag for a practice, game, or match of a sport (e.g., hockey, baseball, soccer, lacrosse, etc.).

Programming features of embodiments according to the present invention may assist users by providing suggestions to a user based on usage by other people similar to the user, the user's past behavior or instructions the user provided previously. Such systems and methods may provide recommendations based on packing lists created by persons other than the user. The systems may learn from past behavior and the association of products (e.g., if laptop is packed, power cord must also be packed). Further, such systems and methods may be aware of types of planned or expected activities, as well as weather forecasts, seasons, or other conditions that might influence what objects are suggested (e.g., umbrella).

Systems and methods according to the present invention may be used in connection with a single container (such as a student's backpack) or multiple containers (such as a briefcase and a suitcase for a business trip).

Systems and methods according to the present invention may employ adhesive RFID labels for objects that need to be located a single time or a few times (like copies of an exam or homework for an educational class) or persistent, more durable RFID tags for objects that are expected to be tracked many more times such as a power cord of a laptop computer. However, adhesive RFID labels could additionally or alternatively be used on durable goods.

Systems and methods according to the present invention are not generally related to locating lost objects. Instead they are directed to helping to ensure that expected objects are located appropriately at a predefined, estimated, or predicted time.

BRIEF DESCRIPTION OF THE DRAWINGS

FIG. 5 displays perspective embodiments of exemplary container types.

FIG. 6 displays perspective embodiments of exemplary objects.

FIG. 7 is a pictorial representation of an object query step of a method according to the present invention.

FIG. 8 is a pictorial representation of a display step of a method according to the present invention.

FIG. 11A is an elevation view of an electronic device depicting a login display according to the present invention.

FIG. 11B is the device of FIG. 11A depicting a welcome display according to the present invention.

FIG. 12A is the device of FIG. 11A depicting an item display according to the present invention.

FIG. 12B is the device of FIG. 11A depicting an item entry display according to the present invention.

FIG. 13A is the device of FIG. 11A depicting a bags display according to the present invention.

FIG. 13B is the device of FIG. 11A depicting an attach bag display according to the present invention.

FIG. 13C is the device of FIG. 11A depicting a bag entry display according to the present invention.

FIG. 14A is the device of FIG. 11A depicting a configurations display according to the present invention.

FIG. 14B is the device of FIG. 11A depicting a configuration entry display according to the present invention.

FIG. 15A is the device of FIG. 11A depicting an events display according to the present invention.

FIG. 15B is the device of FIG. 11A depicting an event entry display according to the present invention.

DETAILED DESCRIPTION

Although the disclosure hereof enables those skilled in the art to practice the invention, the embodiments described merely exemplify the invention which may be embodied in other ways. While the preferred embodiment has been described, the details may be changed without departing from the invention, which is defined by the claims.

Figure 1:
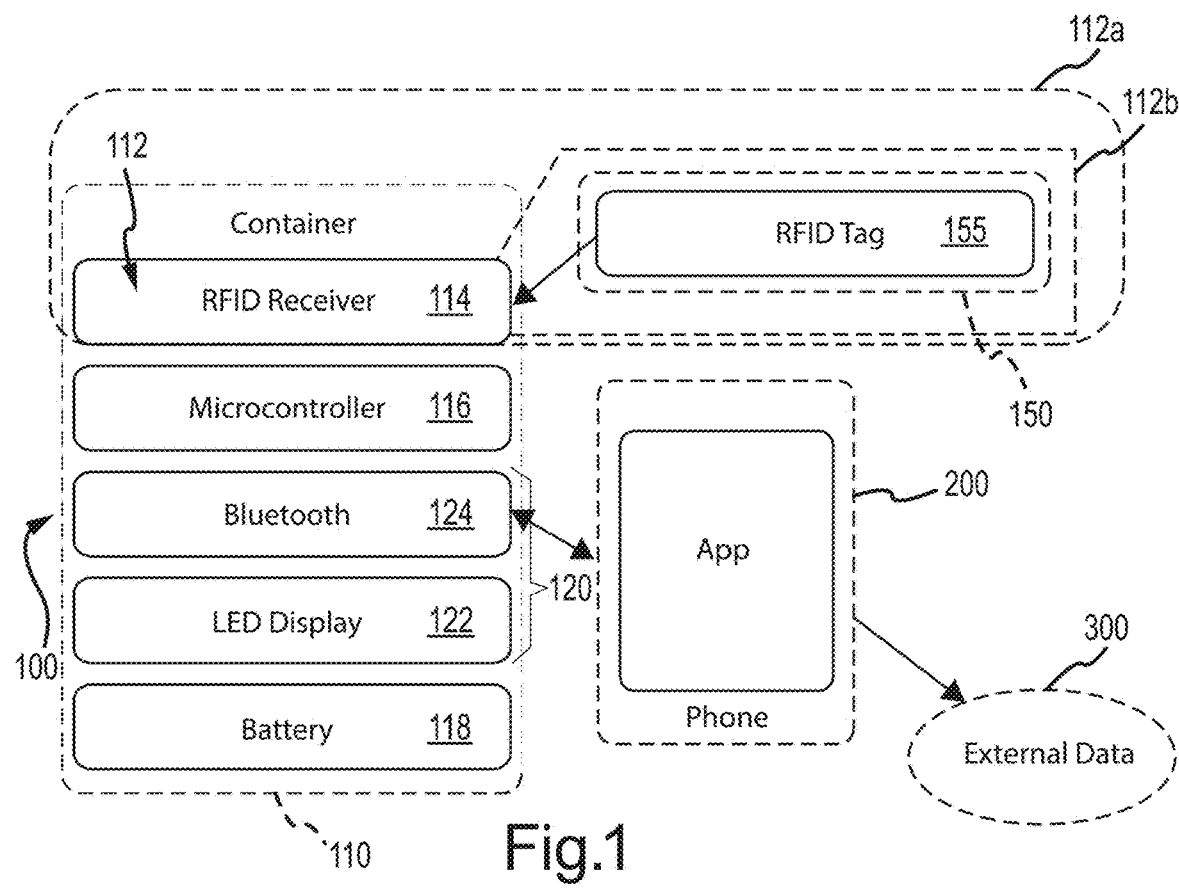
FIG. 1 is a block diagram of an embodiment of a system according to the present invention.

Turning now to the figures, FIG. 1 is a block diagram of a system 100 according to the present invention. Generally, the system 100 includes a container 110 supporting and/or containing a sensor 112, which is capable of detecting the presence of an object 150 or associated identifier 155 within a predefined space. The sensor 112, such as a radio frequency identification (RFID) receiver or reader 114, may be controlled by a microcontroller 116. The container 110 preferably also supports or contains a power source, such as a battery 118, or at least a connection to a power source, to provide electrical power to the sensor. The container 110 may further provide user communication interfaces 120, which may be one or more direct communication interfaces 122, such as a single light emitting diode (LED), an LED display and/or piezo buzzer, and/or indirect communication interfaces 124, such as a wireless communication interface (e.g. Bluetooth, WiFi (IEEE 802.11), infrared (IrDA)), and/or a wired communication interface (not shown) (e.g., universal serial bus (USB), video graphics array (VGA), high-definition multimedia interface (HDMI)). A direct communication interface 122 provides information or representations of information to be perceived directly by a person (e.g. visually and/or aurally). An indirect communication interface 124, communicates with another device 200, such as a mobile phone, tablet computer, laptop computer, display monitor, etc., to provide information to a person or to access information data on (or receive data from) the device 200, or through the device 200 from an external data source 300, such as an internet server.

As indicated, the sensor 112 is capable of detecting the presence of an object 150 (as represented by an associated identifier 155) within a first predefined space 112a, which may be defined as the maximum detection range within the capabilities of the sensor 112. An arrangement of the sensor 112 may also be configured, as further explained below, to exclude some of the first predefined space 112a, to limit the capability of the sensor to a second, preferably smaller space 112b, which may be substantially defined by one or more compartments of the container 110. Thus, while the second space 112b is depicted as being outside of the container 110 for clarity, the second space 112b is preferably substantially or completely within the container 110.

Figure 2:
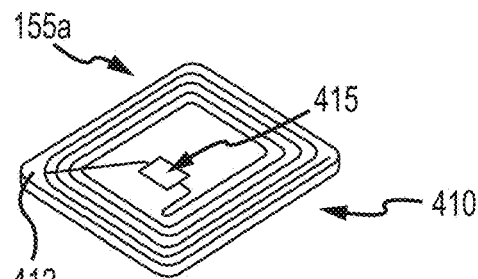
FIG. 2 is a perspective view of a first embodiment of a radio frequency identification (RFID) tag.
Figure 3:
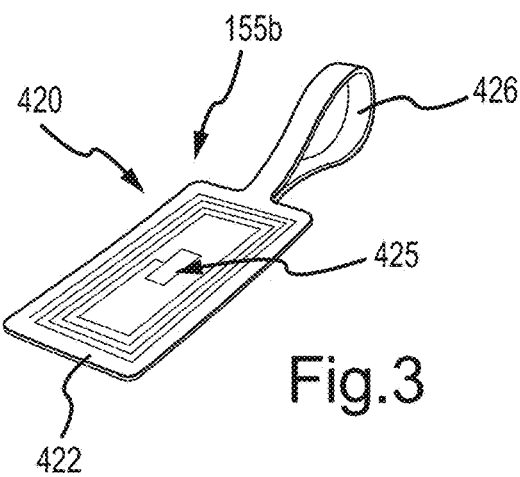
FIG. 3 is a perspective view of a second embodiment of a RFID tag.
Figure 4:
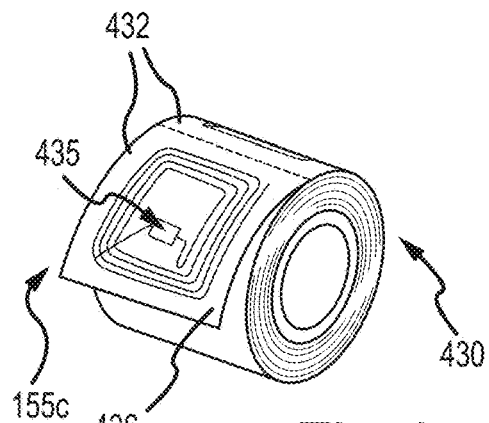
FIG. 4 is a perspective view of a plurality of RFID labels disposed on a roll.

FIGS. 2-4 depict various embodiments of object identifiers (e.g., codes) 155a,b,c, such as radio frequency identification tags or labels. FIG. 2 shows a first embodiment 410 of an RFID tag, which may have a substantially rigid (e.g., substantially plastically deformable) body 412 supporting an RFID circuit 415. The tag 410 may be secured to an object 150 in a plurality of ways, such as by being adhered thereto. FIG. 3 provides a second embodiment 420 of an RFID tag, which may include a more flexible (e.g., substantially elastically deformable) flap 422 supporting an RFID circuit 425. Extending preferably integrally from the flap 422 may be a hitch loop 426 that can be used to secure the tag 420 to an object 150. FIG. 4 shows an embodiment 430 of a roll of RFID labels 432 supporting an RFID circuit 435 on a flexible, preferably adhesive-backed substrate 436, which may be covered by a releasable liner (not shown). Each successive label 432 may be removed from the roll 430, its adhesive exposed, and then secured to an object 150 by the adhesive.

FIG. 5 displays exemplary containers 110. A first container 110a is a backpack, including a plurality of shoulder straps 160 and one or more interior compartments 162. A second container 110b is a briefcase, including a single handle 164 pivotably coupled to its exterior and including a single interior compartment 166. A third container 110c is a suitcase, including preferably a plurality of carry handles 168 attached to its exterior and at least one interior compartment 170. The suitcase 110c may further include an extendable tow handle 172 and roller wheels (not shown) disposed opposite the tow handle 172. A fourth container 110d is a purse or handbag, including one or more carry handles 174 extending from a top portion 176 of an open- or closed-top base 178, which surrounds at least one interior compartment 180. Other containers 110 may include sports equipment bags (e.g., hockey equipment bag, lacrosse equipment bag, yoga bag, weightlifting bag), insulated coolers (e.g., for insulating food and/or drink items, or for medical transport of organs, blood, or tissue), tool boxes, or household storage locations (e.g., medicine cabinet, refrigerator, freezer, closet). As stated above, an arrangement of a sensor 112 on a container may be configured to exclude some of the first predefined space 112a, to limit the capability of the sensor to a second, preferably smaller space 112b, which may be substantially defined by one or more compartments of the container 110. This may be done by partially or substantially completely lining the desired container compartments with, or partially or substantially completely constructing container compartments from, a radio frequency (RF) shielding material, such as one or more of copper plated polyester, nickel/copper plated polyester, nonwoven carbon fibers, woven stainless steel (with or without other fabrics such as polyester or cotton), silver plated nylon, and nickel/copper/cobalt plated polyester. By creating a compartment of a container 110 that is lined with such material(s), and allowing the sensor 112 communicative access to that lined compartment (such as by placing the sensor 112 within that compartment), the detection of object identifiers 155 by the sensor 112 is limited to the desired compartment(s) of the container 110. This helps prevent false positive if objects are near a container 110 but not within the desired compartment thereof.

FIG. 6 shows exemplary objects 150. A first object 150a is a laptop computer including a hinged display 182 coupled to a keyboard/trackpad 184 and an RFID label 432 adhered thereto. A second object 150b is a charging cable, including a first end 186a for plugging into a power mains, a second end 186b for plugging into an electronic device (such as the laptop computer 150a), and a transformer 188 disposed therebetween. An RFID label 432 is adhered to the charging cable, such as by being adhered to the transformer 188. A third object 150c is a book having a cover 190 and an RFID label 432 adhered thereto, which may be positioned to the outside or inside of the cover 190. A fourth object 150d is a notebook having a cover 192 and an RFID label 432 adhered thereto, which may be positioned to the outside or inside of the cover 192. Other objects 150 may include a tablet computer, a mobile phone, sports equipment (e.g., hockey pads/helmet/gloves, lacrosse pads/helmet/gloves, yoga mat/blocks/belts, weightlifting gloves/belt/chalk, shower accessories (e.g., soap container, razor, deodorant)), food and/or drink items, medical transport objects (organs, blood, or tissue), tools (e.g., hand tools, power tools, surgical instruments), medication containers, clothing, or household cleaners, etc. While an RFID label is shown as being adhered to the objects 150, it is to be understood that an RFID label, tag or circuit may be embedded within an object 150.

FIGS. 7 and 8 are pictorial representations of steps in a method according to the present invention. FIG. 7 pictorially depicts a portion of an item or object query step and FIG. 8 pictorially depicts a portion of an alert display step. These figures will be referenced in discussion about FIG. 10, below.

Figure 9:
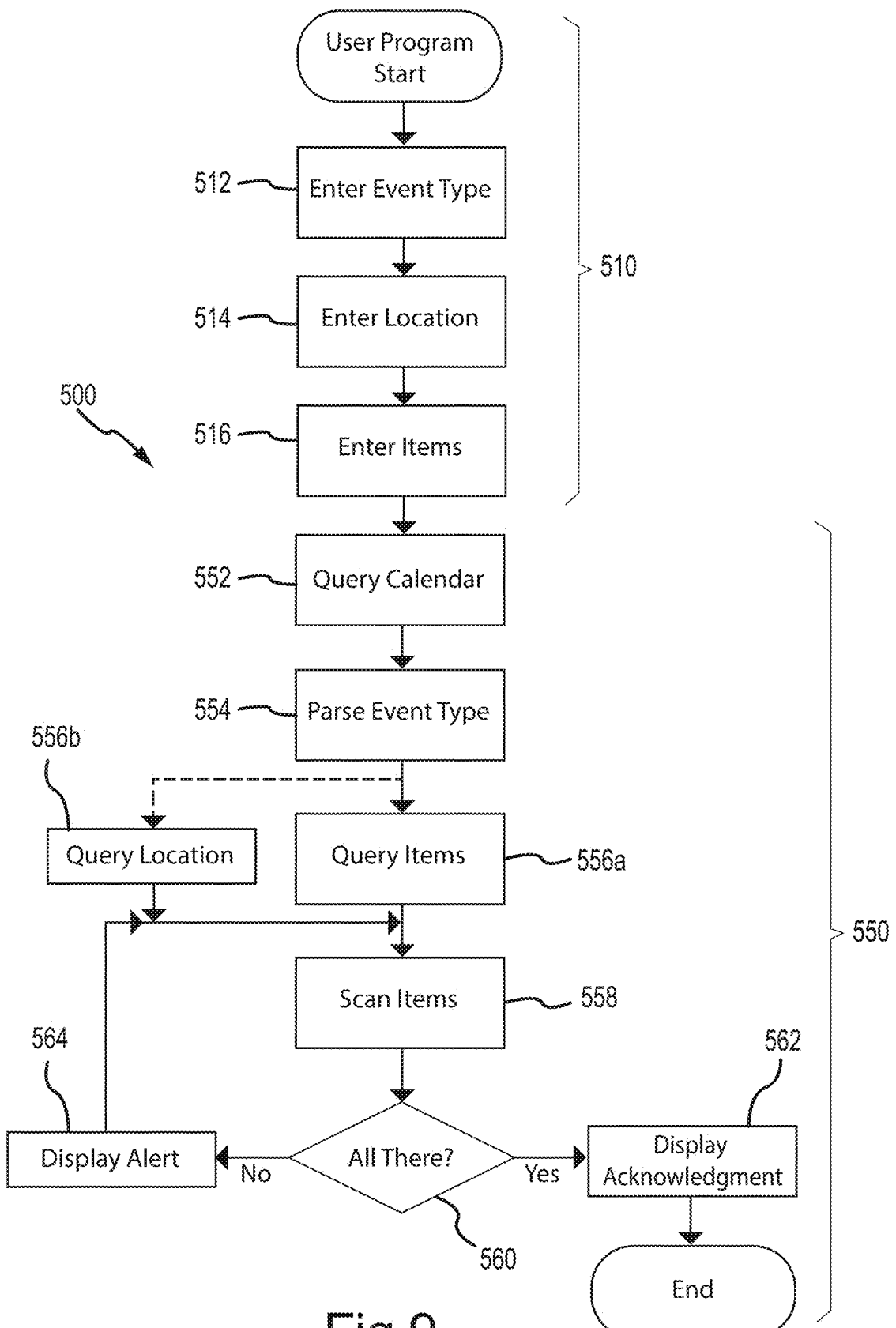
FIG. 9 is a flowchart of a first embodiment of a method according to the present invention.

FIG. 9 is a flowchart of a first method 500 according to the present invention. The method 500 generally includes a set 510 of program steps and a set 550 of processing steps. The program set 510 includes steps of establishing a single conditional factor or multiple conditional factors with which to associate one or more expected objects 150, where conditional factors are preferably associated with a scheduled event (e.g., calendar entry). The processing set 550 includes steps of utilizing the conditional factors to identify expected objects 150 and compare packed objects 150 present in a particular space to the expected objects 150 to determine whether any packed objects are missing. The program set 510 generally involves human interaction and data entry, or it can be automatic, while the processing set 550 is preferably performed without human interaction, but may also be initiated manually. This method 500 will be explained as if the programming 510 is performed manually and the processing 550 is performed automatically. The programming 510 may be performed on a human machine interface (HMI) supported by or coupled to a container 110 and the processing 550 may be performed by a computer system (e.g., including a microcontroller or microprocessor 116) communicatively coupled with the HMI and also supported by the container 110. Alternatively, either set of steps 510,550 or individual steps thereof, may be carried out on an electronic device 200 in communication with a computer system supported by the container.

Referring to FIGS. 1 and 9, conditional factors are programmed in one or more steps in a method according to the present invention. In one programming step 512, a conditional factor in the form of an event type (e.g. Sales Meeting, Presentation, Algebra 101, Picnic) is programmed by a user into nonvolatile memory to be accessed by the microcontroller 116. The memory may be local (e.g. supported by the container 110) or remote (e.g. on a mobile phone 200). In another programming step 514, a conditional factor in the form of a location (e.g. Coffee Shop, Client Name/Address, Jones Hall Rm 303, City Park) may be programmed by a user into nonvolatile memory (preferably the same nonvolatile memory hardware) to be accessed by the microcontroller 116. Either or both of the first programming step 512 and the second programming step 514 may be undertaken. Another programming step 516 involves the association of expected items or objects 150 with the programmed event type and/or location conditional factors, or other conditional factors previously or later programmed or analyzed. That is, the programming steps do not have a particular order. The programming into nonvolatile memory creates a relational database to be used to provide functionality according to the present invention.

Expected items or objects 150 may be predefined individually in lists according to event types or other conditional factors (e.g. location) or objects may be specified uniquely by a user, or a combination of the two. In any event, the result of the programming steps 510 is an association of expected objects 150 with conditional factors. This association may be represented in tablature form as shown in Table 1.

TABLE 1

| Conditional Factors | | |
|---|---|---|
| Event Type: | Sales Meeting | Hockey Practice |
| Location: | XYZ Corp. | <null> or nonexistent |
| Associated Expected Object Lists | | |
| Object 1: | Laptop computer | SkateLeft |
| Object 2: | Laptop power cord | SkateRight |
| Object 3: | Presentation remote control | GloveLeft |
| Object 4: | Business cards | GloveRight |
| Object 5: | XYZ Corp. File | KneePadLeft |
| Object 6: | LCD Projector | KneePadRight |
| Object 7: | Product Samples | ShoulderPads |
| Object 8: | <null> or nonexistent | ElbowLeft |
| Object 9: | <null> or nonexistent | ElbowRight |

TABLE 1-continued

| | | |
|---|---|---|
| Object 10: | <null> or nonexistent | Breezers |
| Object 11: | <null> or nonexistent | Helmet |
| Object 12: | <null> or nonexistent | Jersey |
| Object 13: | <null> or nonexistent | SockLeft |
| Object 14: | <null> or nonexistent | SockRight |
| Object 15: | <null> or nonexistent | ProtectiveCup |

There may be a fixed number of expected objects associated with each conditional factor, but it is preferred to have a variable number of expected objects selected from a master expected object list, to avoid duplication of programming steps. In other words, from a master expected object list, a hash may be created from the conditional factors (e.g., event type, location, etc.), and from that hash, expected objects are preferably selected from the master expected object list.

Additionally or alternatively, other conditional factors may be used and associated with items or objects 150, where such factors are predefined or defined by a user. At least one, but preferably all conditional factors for a particular scheduled event are utilized to generate an expected object list. In this fashion, greater resolution is provided for a scheduled event, and more tailored expected object lists may be generated. Alternatively, fewer than all conditional factors for a particular scheduled event may be used, because in certain situations, a user may not have all the information necessary to establish a complete conditional factor set.

To use the conditional factors and associated expected objects, the processing steps 550 are executed. In one step 522, a scheduled event is identified, such as by querying a calendar. This query may be manual or automatic, such as by analyzing a server-maintained calendar (e.g., Outlook®, Google®) or a local electronic calendar (e.g., Windows®, Android®). A calendar event is identified and one or more conditional factors are parsed 554 to query (i.e. identify) expected objects 556a associated with the parsed conditional factors. Additional conditional factors may be queried 556b and/or parsed from a calendar event to arrive at an expected object list. An object space 112b having been predefined, a determination is then made of packed objects present in the predefined space 112b, as represented by the presence of respective associated identifiers 155, to arrive at a packed object list. The expected object list is then compared 560 against the packed object list to determine if the objects included on each list match. If all objects on the expected object list are included in the packed objects list, then an acknowledgement or confirmation is displayed 562 to a user and the process is complete. If all objects on the expected object list are not included in the packed objects list, then an alert is displayed to a user, and the process will return to regenerate the packed object list. The regeneration of the packed object list can be performed automatically after a predetermined delay time or can be manually initiated (e.g., by pushing a button) after additional objects have been placed into the predefined space.

While the method 500 is primarily concerned with identifying objects that are missing from a predefined space at a predetermined (or manually activated) time, the method may optionally include a step or sub-step routine to inform a user if the packed object list includes items that are not on the expected object list. In other words, a two-way comparison between the expected object list and packed object list is contemplated.

Also, certain steps 552,554,556 may be simplified in situations where a predefined space is to be analyzed for particular contents periodically or manually. For instance, in certain home or medical situations, if a medicine cabinet, for example, is to be monitored, the packed object list may be generated periodically at a predetermined interval (e.g., every minute, hour, day, week, month, year, or plurality of any of these) and the comparison with the expected object list occurring at substantially the same interval. If the comparison 560 indicates that objects are missing, an alarm may sound.

Figure 10:
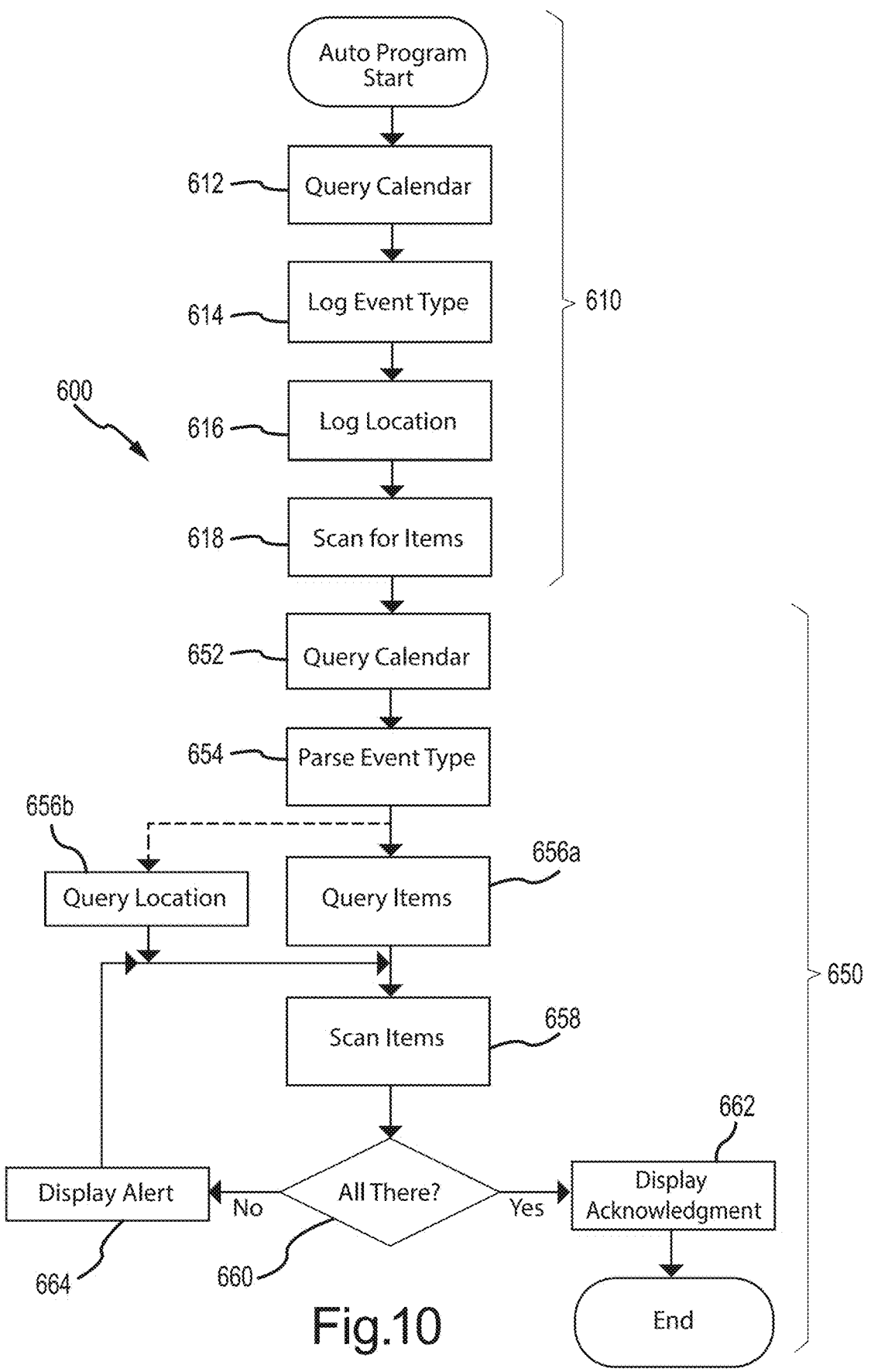
FIG. 10 is a flowchart of a second embodiment of a method according to the present invention.

FIG. 10 is a flowchart of a second method 600 according to the present invention. This method 600 generally includes a set 610 of program steps and a set 650 of processing steps. The program set 610 includes steps of establishing a single conditional factor or multiple conditional factors with which to associate one or more expected objects 150, where conditional factors are preferably associated with a scheduled event (e.g., calendar entry). The processing set 650 includes steps of utilizing the conditional factors to identify expected objects 150 and compare packed objects 150 present in a particular space to the expected objects 150 to determine whether any packed objects are missing. In this method 600, both the program set 610 and the processing set 650 of steps are executed largely automatically, though they may be initiated manually. Indeed, the processing set 650 of steps is at least substantially similar or identical with the processing set 550 of the first method 500 discussed above. However, unlike the program set 510 of the first method 500, the program set 610 of this method is undertaken substantially automatically, though it may be initiated manually. The programming 510 may be performed on a human machine interface (HMI) supported by a container 110 and the processing 550 may be performed by a computer system (e.g., including a microcontroller or microprocessor 116) communicatively coupled with the HMI and also supported by the container 110. Additionally or alternatively, either set of steps 510,550 or individual steps thereof, may be carried out on an electronic device 200 in communication with a computer system supported by the container.

In this method 600, an expected object list is created at a request of a user that has packed objects into the predefined space. In other words, a user has manually confirmed the presence of desired objects to be associated with one or more conditional factors. Upon initiating the program set 610, conditional factors are automatically logged, such as by querying 612 a user's calendar and logging conditional factors, such as an event type 614 and/or a location 616. Other or alternative types of conditional factors may be predetermined, such as current or future predicted weather conditions at the location that has been logged, time of year, local national holidays at the location, etc. In a scanning step 618 (such as with the RFID reader 114), the objects that have been placed into the predefined space will be logged, and an expected object list will be generated. This expected object list will be used by the processing set 650 at future times when the respective conditional factors are satisfied. The automatic program set 610 may be repeated multiple times (manually or automatically) to modify expected object lists associated with conditional factors, thereby "learning" object packing behavior of a particular user.

It may also be advantageous to monitor contents of a container 110 in a "locked" mode, where that container is to be left, in a potentially unsecure place for example. In such situation, a manual scan (e.g., 618) may be initiated so that the contents of the container 110 are learned and an expected object list is generated. A manual scan of each object 150 to be associated with a container 110 may also be performed. After the contents are learned, scanning (e.g., 658) and comparing (e.g. 660) may be automatically performed at periodic intervals, either continuously or upon the occurrence of an event or continuously for a predetermined time upon the occurrence of an event. For instance, a user decides to leave a container 110 in an unoccupied hotel room or baggage check, into which hotel staff may have access. Prior to leaving the container 110, the user may ensure desired contents are in the container 110 and the scan may be manually initiated to virtually "lock" the container 110. While the user is away from the container 110, the scanning (e.g., 658) and comparing (e.g. 660) may be automatically performed at periodic intervals, such as one scan and one compare every hour or multiple thereof, every minute or multiple thereof, or every second or multiple thereof. The automatic scanning may alternatively be initiated by an occurrence of an event, such as movement of the container 110 (e.g. causing movement of an accelerometer), and the automatic scanning and comparing may thereafter execute once, a plurality of predetermined times, or continue periodically. The results of any comparison resulting in a mismatch between the expected object list and the scanned object list are logged in electronic memory carried by the container 110 after each mismatch and/or transmitted to the user, either realtime (if the container 110 is communicatively coupled to a communications network) or when the user and container 110 are reunited. The log entry of a mismatch may include information such as identification of mismatched object(s), time of day of mismatch, duration of mismatch, and location (geographic or otherwise) of container at time of mismatch.

A representative electronic device 200 with a user interface 1010 of a software application is shown in FIGS. 11A-15D. That is, the user interface 1010 includes a display of information, suggestions, user prompts, and/or instructions, and interactive options for a user of the electronic device 200. Interactive options may be provided as virtual pushbuttons, such as images displayed on a capacitive display screen (touch screen) to be selected with a user's finger or a stylus, or as soft buttons associated with physical pushbutton switches on the device 200. FIG. 11A provides a login display 1100, including a username prompt 1102, a password prompt 1104, and a login virtual pushbutton 1106. The prompts 1102,1104 are preferably capable of receiving text entry, such as from a QWERTY keyboard displayed on the interface after one of the prompts is selected. After a user has entered a combination of a username and associated password (the correct combination(s) of which may be stored locally on the device 200 or remotely on a datastore accessible over a network by the device 200), the login pushbutton 1106 may be selected, the combination verified against correct combinations, and access to the application may be allowed after confirmation of entry of a correct combination. Additionally or alternatively, a biometric confirmation, such as an electronic fingerprint analysis or iris scan, may be used to log in.

Upon entry of a correct username and password combination or biometric identification, and login confirmation, a Welcome display 1110 may be presented to the user, as shown in FIG. 11B. This display 1110 may serve as a homescreen, from which various aspects of the application may be viewed and/or managed. Preferably, the Welcome display 1110 includes an event list 1120 and an option list 1130. The event list 1120 includes one or more displayed event entries 1122, such as only the next chronologically scheduled event, or a day's scheduled event(s). Each event entry 1122 preferably includes an associated event name 1124, date/time 1126, and event status indicator 1128. The event name 1124 and date/time 1126 are created or selected by a user in an event creation process, described more fully below. The event status indicator 1128 provides a visual indication of whether or not all required items are packed in a particular container for the event. The event status indicator 1128 is preferably a color coded shape, with a first color (e.g., green) indicating that the device 200 is in communication with a container 110, and items associated with defined container configuration have been scanned and/or packed in the container 110. A second color (e.g., orange or yellow) may indicate that the device 200 is in communication with the container 110, but one or more items have not been scanned and/or packed in the container 110 according to a predefined configuration. A third color (e.g., red) indicates that the container associated with the particular event is not in communication with the device. Any portion of an event entry 1122 may be selectable by a user, such as being provided as a hyperlink or otherwise, to enable a user to navigate to an event display 1500, as shown in FIG. 15b, and further described below. Preferably, every display (interface) that is provided after a user has successfully logged in includes a top level menu virtual pushbutton 1101. Upon selection of this option 1101, a variety of other selections may be displayed for the user, such as "Home" to return to the Welcome display 1110 and/or any one or more of the option list options 1130 from the Welcome display 1110.

The option list 1130 on the Welcome display 1110 preferably includes a plurality of virtual push buttons providing a user with options to view and configure the application. Preferably, there are four options: an Item management option 1132, a Bag management option 1134, a Configuration management option 1136, and an Event management option 1138. Further, there is preferably an Account management option 1140 and a Help option 1142. Selection of the Item management option 1132 preferably navigates a user to an Items display 1200, as shown in FIG. 12A. Selection of the Bag management option 1134 preferably navigates a user to a Bags display 1300, as shown in FIG. 13A. Selection of the Configuration management option 1136 preferably navigates a user to a Configurations display 1400, as shown in FIG. 14A. Selection of the Event management option 1138 preferably navigates a user to an Events display 1500, as shown in FIG. 15A. Selection of the Account management option 1140 may navigate a user to a Manage Account display 1150, such as that shown in FIG. 11C. Selection of the Help option 1142 preferably navigates a user to a Help display (not shown), which may provide an index or descriptions of application operability, such as the management steps described herein.

Figure 11C:
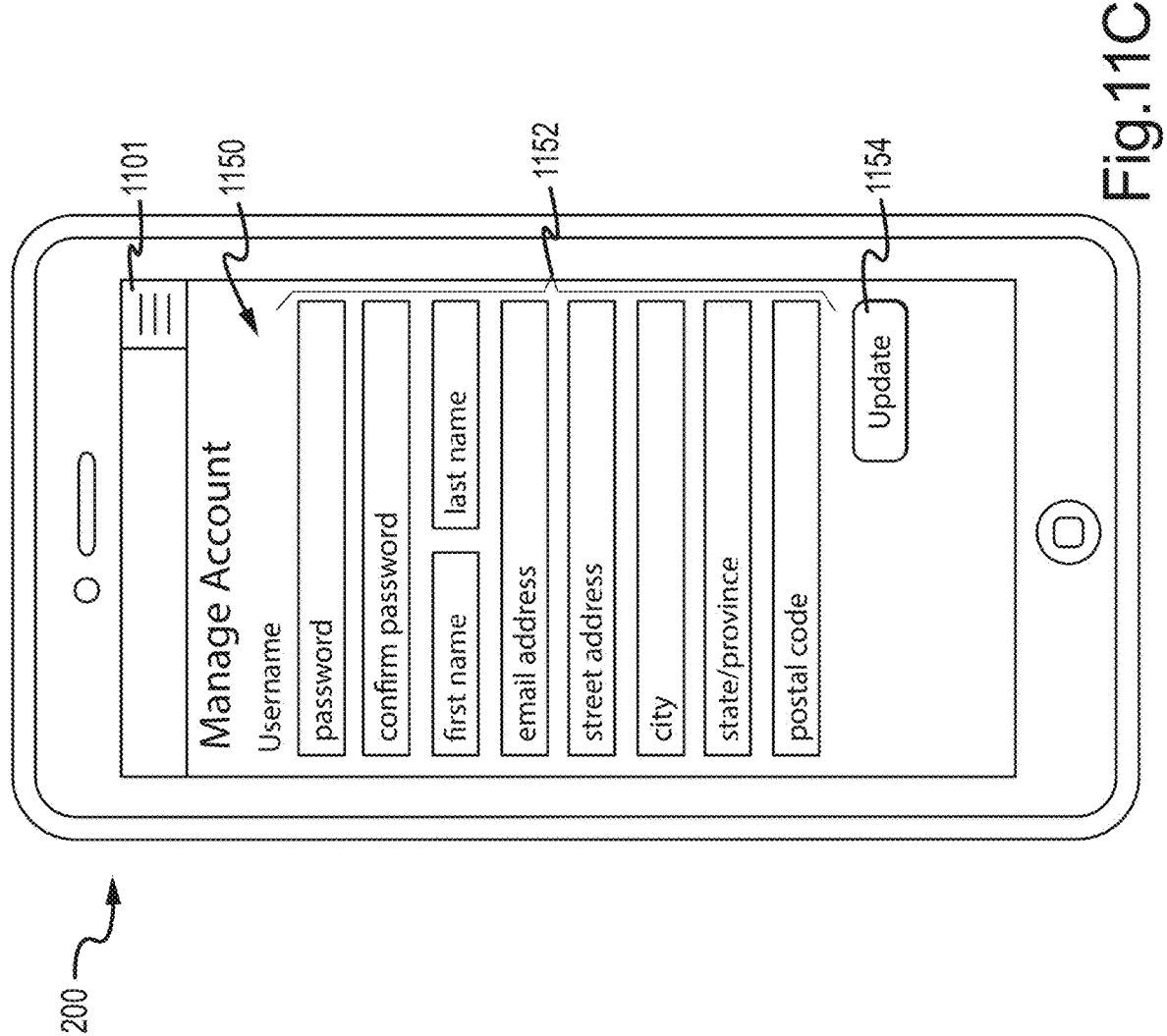
FIG. 11C is the device of FIG. 11A depicting a manage account display according to the present invention.

The Manage Account display 1150, shown in FIG. 11C, provides a user interface to allow a user to associate various personal information 1152 with his or her account in the application on the device 200. Such information 1152 may include a password (with confirmation), the user's first and last name, and contact information, such as email address, physical address (e.g., postal address) including a street, city, state/province, and postal code. An Update virtual pushbutton 1154 may be provided to enable the user to synchronize the information provided on this display 1150 with a remote server over a communications channel.

FIG. 12A depicts an embodiment of an Item display 1200, which may be displayed after the Item management option 1132 on the Welcome display 1110 is selected. Through this display 1200, a user is able to view and add items, which may eventually be associated with a particular container (e.g., bag) in a particular configuration. The Item display 1200 preferably includes an Add Item virtual pushbutton

1202, and at least one inventory list 1210, which may be divided into a permanent inventory list 1212 and a temporary inventory list 1214. The inventory list 1210 includes item entries 1216, each item entry 1216 including an item name 1218 and an item status 1220. The item name 1218 is created or selected by a user in an item creation process, described more fully below. The item status indicator 1220 is preferably a color coded shape, with a first color (e.g., green) indicating that the device 200 is in communication with a container 110, and the respective item is associated with a defined container configuration and has been scanned and/or packed in the container 110. A second color (e.g., red) may indicate that the respective item has not been associated with a container 110 that is in communication with the device 200. A third color (e.g., black) indicates that the respective item is not yet associated with an RFID tag 155. Any portion of an item entry 1216 may be selectable by a user, such as being provided as a hyperlink or otherwise, to enable a user to navigate to an item entry display 1250, as shown in FIG. 12B, and further described below.

If the Add Item pushbutton 1202 is selected by a user, an item entry display 1250 is presented, as shown in FIG. 12B. In this interface, a user may change or enter a name of an item ("Cap" in this embodiment), and an optional photo entry field 1252 may be displayed along with a textual description 1254 of the item, which may be edited by the user. By selecting the photo entry field 1252, the user may be prompted to either capture a photograph using a camera provided on the device 200, or to select a photograph from a photo storage location (e.g., the user's photo gallery on the device 200 or synchronized remote server). An inventory type indication 1256 may be displayed to convey whether the item is permanent inventory or temporary inventory, and an associated configuration list 1258 may be displayed. The configuration list 1258 simply displays a listing of configurations that have been associated with the respective item, such as through selection(s) made in the item list 1458 in the configuration entry display 1450 of FIG. 14B. As used herein, a "permanent" item is generally understood to be an item that is likely to be used multiple times, perhaps for different events, configurations, and/or containers. As used herein, a "temporary" item is generally understood to be an item that is likely to be used only a single time, or sporadically, and therefore is not intended to be generally repeatedly associated with a particular type of event, configuration, or container. Preferably, the items to be entered from the item entry display 1250 accessed from the Item display 1200 are only permanent items. Temporary items are preferably added by a user directly to a particular event, and are not associated with future events unless manually added to such future event. Further options to delete 1260 the item from the application or to update 1262 the item's information (e.g., save the changes) are provided. The delete functionality 1260 is provided preferably only for permanent inventory items and temporary items are preferably removable only from within a particular event, as explained below. Finally, a "back" option 1264, which will return a user to the Item display 1200 without saving any changes, such as when a user accesses the item entry display 1250 for reference.

FIG. 13A depicts an embodiment of a Bags display 1300, which may be displayed after the Bag management option 1134 on the Welcome display 1110 is selected. The Bag display 1300 generally includes a container list 1310 and an Add Bag virtual pushbutton 1312. The container list 1310 includes bag entries 1314, each bag entry 1314 including a bag name 1316 and a bag status 1318. The bag name 1316 is created or selected by a user in a bag entry process, described more fully below. The bag status indicator 1318 is preferably a color coded shape, with a first color (e.g., green) indicating that the device 200 is in communication with the respective container 110. A second color (e.g., red) may indicate that the respective container has been paired with the device (e.g., Bluetooth pairing) and associated with the software application, but the container is not currently connected (e.g., out of communication range, container communication device powered off, device 200 communications powered off). A third color (e.g., black) indicates that the respective container is not yet associated with the device 200 and software application. Any portion of a bag entry 1314 may be selectable by a user, such as being provided as a hyperlink or otherwise, to enable a user to navigate to a bag entry display 1350, as shown in FIG. 13C, and further described below.

If a user selects the Add Bag option 1312 from the Bags display 1300, an Attach Bag display 1330 may be presented, as shown in FIG. 13B. From this display 1330, a user may attempt to place the device 200 in communications with a container 110, or opt to add a container 110. This display 1330 provides a container list 1332, an Attach option 1334, and a Back option 1336. The container list 1332 includes entries each including a bag name 1338, upon user selection of which initiates a communication pairing process between the device 200 and the selected container 110, such as a Bluetooth pairing process, as that process is understood in the art, or other establishment of a communication channel, such as through a handshake protocol. If the user desires to add a new bag to communicate with, the user may select the Attach option 1334, which may then result in the presentation of the bag entry display 1350, as shown in FIG. 13C. Alternatively, a user may return to the Bags display 1300 by selecting the Back option 1336.

FIG. 13C depicts a bag entry display 1350, which may be accessed through interaction on the Bags display 1300 or the Attach Bag display 1330, previously discussed. In this interface, a user may change or enter a name of a container ("Backpack" in this embodiment), and an optional photo entry field 1352 may be displayed along with a textual description 1354 of the item, which may be edited by the user. By selecting the photo entry field 1352, the user may be prompted to either capture a photograph using a camera provided on the device 200, or to select a photograph from a photo storage location (e.g., the user's photo gallery on the device 200 or synchronized remote server). An associated configuration list 1358 may also be displayed. The configuration list 1358 simply displays a listing of configurations that have been associated with the respective container, such as through selection(s) made in the container list 1456 in the configuration entry display 1450 of FIG. 14B. A bag status 1318, indications of which have been previously described, may be provided as a virtual pushbutton, which may initiate or facilitate a communication pairing functionality between the device 200 and the indicated container 110. Additionally or alternatively, such pushbutton may be used to provide access for a user to change communications settings (e.g., Bluetooth settings) Further options to delete 1360 the container from the application or to update 1362 the container's information (e.g., save the changes) are provided. Finally, a "back" option 1264, which will return a user to the Bags display 1300 without saving any changes, such as when a user accesses the bag entry display 1350 for reference.

FIG. 14A depicts an embodiment of a Configurations display 1400, which may be displayed after the Configuration management option 1136 on the Welcome display 1110 is selected. The Configurations display 1400 generally includes a configuration list 1410 and an Create Configuration virtual pushbutton 1412. The container list 1410 includes bag entries 1414, each bag entry 1414 including a configuration name 1416. The configuration name 1416 is created or selected by a user in a configuration entry process, described more fully below. Any portion of a configuration entry 1414, such as the configuration name 1416, may be selectable by a user, such as being provided as a hyperlink or otherwise, to enable a user to navigate to a configuration entry display 1450, as shown in FIG. 14B, and further described below.

FIG. 14B depicts an embodiment of a configuration entry display 1450, including a configuration name 1452 ("Practice Clothes" in this case) and configuration description 1454, both of which may be textually edited by a user. A bag selection list 1456 and an item selection list 1458 are provided to enable a user to combine one or more items from the item selection list 1458 with one or more bags from the bag selection list 1456. The bag selection list 1456 is preferably populated with container names entered by a user through the bag entry display 1350. Preferably, the bag selection list 1456 includes a selection 1457 which indicates indifference to which container is to be used in the configuration. The item selection list 1458 is preferably populated with item names entered by a user through the item entry display 1250, which are preferably permanent items. Further options to delete 1460 the configuration from the application or to update 1462 the configuration information (e.g., save the changes) are provided. Finally, a "back" option 1464, which will return a user to the Configurations display 1400 without saving any changes, such as when a user accesses the bag entry display 1450 for reference. Once a configuration has been established, it can be assigned to a particular event, to be explained below.

FIG. 15A depicts an embodiment of an Events display 1500, which may be displayed after the Event management option 1138 on the Welcome display 1110 is selected. This display 1500 preferably includes at least one event list, but more preferably a plurality of event lists. Event lists may include at least one of a next event list 1510, a scheduled event list 1512 and/or an unscheduled event list 1514. The Events display 1500 preferably further includes a Create Event virtual pushbutton 1520. Each event list includes event entries 1511, each event entry 1511 including an event name 1513, an event schedule 1515, and an event status indicator 1517. The event name 1513 is created or selected by a user in an event creation process, described more fully below. The event schedule 1515 indicates whether or not the event has been scheduled, and if so, the date, day, and/or time of the event. If the event is not presently scheduled, the event schedule 1515 may be selectable (e.g., hyperlinked) to allow the user to add the event to his or her calendar, which may be a calendaring software application resident on the device 200. The event status indicator 1517 is preferably a color coded shape, with a first color (e.g., green) indicating that the device 200 is in communication with a container 110, and items associated with defined container configuration have been scanned and/or packed in the container 110. A second color (e.g., orange or yellow) may indicate that the device 200 is in communication with the container 110, but one or more items have not been scanned and/or packed in the container 110 according to a predefined configuration. A third color (e.g., red) may indicate that the container 110 associated with the particular event is not in communication with the device 200. Any portion of an event entry 1511 may be selectable by a user, such as being provided as a hyperlink or otherwise, to enable a user to navigate to an event entry display 1530, as shown in FIG. 15B, and further described below.

FIG. 15B depicts an event entry display 1530 according to the present invention. In this interface, a user may change or enter a name 1532 of an event ("Practice" in this embodiment), and an optional date entry field 1534 may be displayed along with a textual description 1536 of the event, which may be edited by the user. By selecting the date entry field 1534, the user may be prompted to either enter a date and time to schedule the event, or to select a date and time from a graphical representation of a calendar (e.g., a date/time picker). Alternatively, the user may be presented with a list of events that have already been scheduled in another software application, such as a calendaring application, and the user may select an event from such list to associate containers, configurations, and items therewith. A Bags and Configurations list 1538 is provided, with each list entry including a name 1538a and a status 1538b. Selection of a Bag and Configuration list entry will associate a particular container 200 and configuration (having been entered by a user on the configuration entry display 1450 of FIG. 14B) with the particular event being created or edited in this display 1530. If a desired container/configuration pair is not provided in the Bags and Configurations list 1538, a user may opt to create such a combination by selecting an Attach bag and configuration virtual pushbutton 1545, which may navigate the user to a Bag and Configuration display 1550 shown in FIG. 15C. The status 1538b is preferably a color coded shape, with a first color (e.g., green) indicating that the device 200 is in communication with a container 110, and items associated with the defined container configuration have been scanned and/or packed in the container 110. A second color (e.g., orange or yellow) may indicate that the device 200 is in communication with the container 110, but one or more items have not been scanned and/or packed in the container 110 according to the predefined configuration. A third color (e.g., red) indicates that the container associated with the particular event is not in communication with the device 200. The event status 1517 may be inherited directly from the status 1538b associated with a particular container/configuration pair.

Figure 15D:
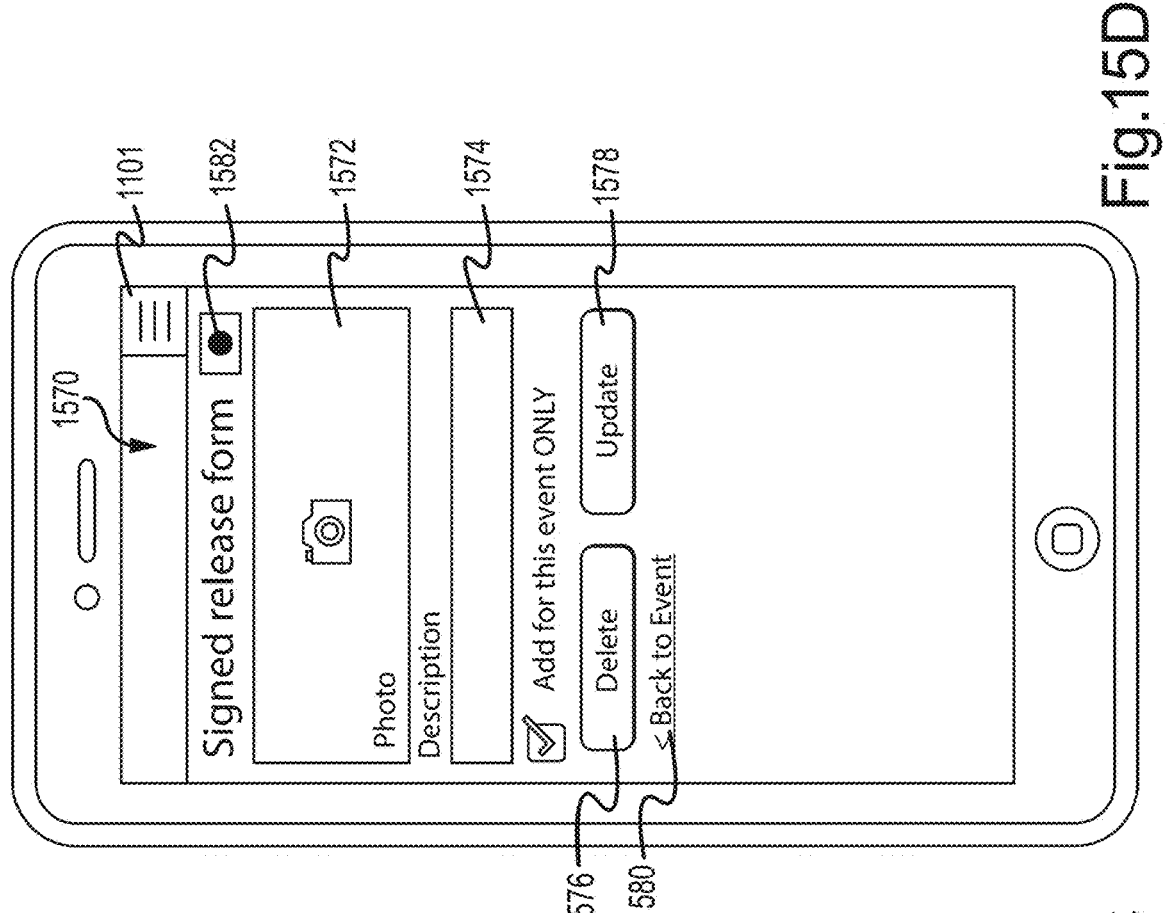
FIG. 15D is the device of FIG. 11A depicting an event item entry interface according to the present invention.

An event item list 1540 is also provided in this display 1530. This list 1540 sets forth the items that are required to be associated with a particular container 110 to successfully complete an event verification process, as described above. The item list 1540 is populated with item names 1540a and associated item status indicator 1540b (e.g., item status indicator 1220, as previously described). The item list 1540 is populated with items extracted from a selected, predetermined configuration and/or temporary items added for a particular event only. Temporary items may be associated with a particular event by entering information through an event item entry interface 1570, as shown in FIG. 15D, which may be accessed through this display 1530 by selection of an Add Item virtual pushbutton 1547. Further options to delete 1542 the event from the application or to update 1544 the item's information (e.g., save the changes) are provided. The delete functionality 1542 is provided preferably to remove an event from this respective software application only, and not to remove the event from any other calendaring software provided on the device 200. Finally, a "back" option 1546, which will return a user to the Events display 1500 without saving any changes, such as when a user accesses the event entry display 1530 for reference.

Figure 15C:
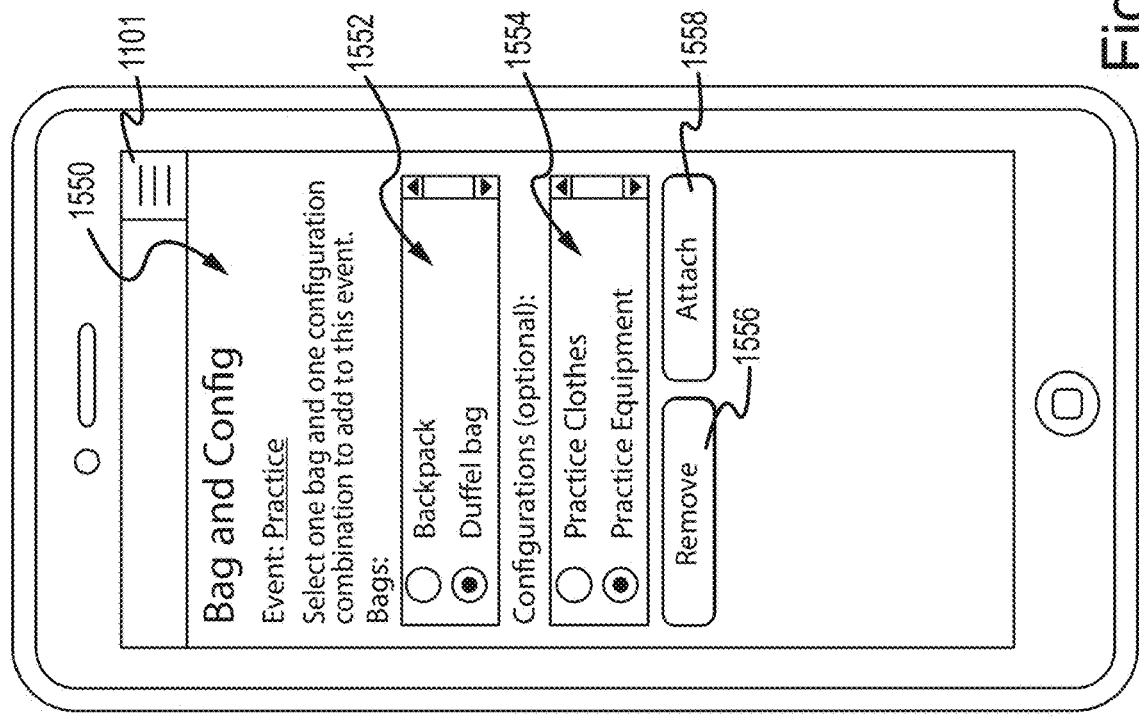
FIG. 15C is the device of FIG. 11A depicting an event bag and configuration entry interface according to the present invention.

FIG. 15C depicts an event bag and configuration entry interface 1550 according to the present invention. This interface 1550 provides a container list 1552 and a configuration list 1554. A container 110 may be added to an event without an associated configuration so that items can be associated with a particular container for the event. If a configuration is also selected from the configuration list 1554 to be associated with the event, then all of the items from that configuration are associated with the event, and will be displayed in the item list 1540 upon saving changes and returning to the event entry display 1530. To exit this display 1550, without associating any container or configurations with the event, a Remove virtual pushbutton 1556 may be selected by a user. To save the selected container and optional configuration, an Attach virtual pushbutton 1558 may be selected by the user. In either event, the user is returned to the event entry display 1530 of FIG. 15B.

FIG. 15D depicts an event item entry interface 1570 according to the present invention. This interface may be accessed by selecting the Add Item virtual pushbutton 1547 from the event entry display 1530, and is used primarily to associate a temporary item with the event being entered. In this interface, a user may change or enter a name of a temporary item ("Signed release form" in this embodiment), and an optional photo entry field 1572 may be displayed along with a textual description 1574 of the item, which may be edited by the user. By selecting the photo entry field 1572, the user may be prompted to either capture a photograph using a camera provided on the device 200, or to select a photograph from a photo storage location (e.g., the user's photo gallery on the device 200 or synchronized remote server). Further options to delete 1576 the item from the event (i.e., dissociate the item from the event) or to update 1578 the event information (e.g., save the changes) are provided. Finally, a "back" option 1580, which will return a user to the event entry display 1530 without saving any changes.

Figure 16:
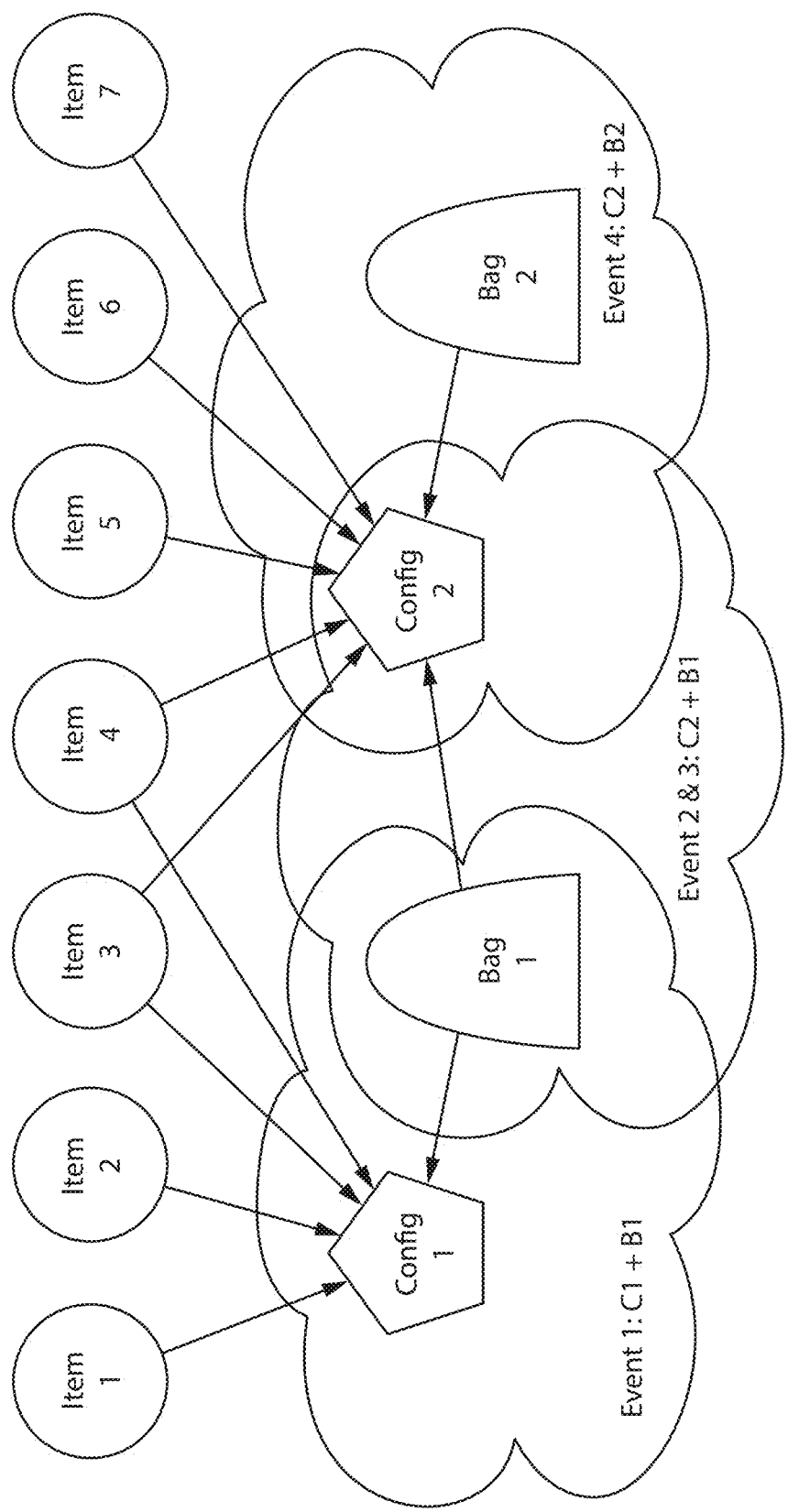
FIG. 16 is a diagram of exemplary relational associations of information according to the present invention.

FIG. 16 is a diagrammatic representation of exemplary relationships between the data constructs in a software application on a mobile device 200 according to the present invention. As can be seen, the application makes possible one-to-one, many-to-one and many-to-many relationships between items and configurations. Further, there is possible one-to-one, many-to-one and many-to-many relationships between configurations and containers 110 (i.e., bag). Such relationships and functionality may be achieved by a relational database, including a plurality of tables of data, such as an item table, a container table, a configuration table, and an event table. In this manner, one or more items can be associated with a particular event and/or with a particular configuration. One or more containers may be associated with a particular configuration. One or more configurations may be associated with a particular event.

Figure 17:
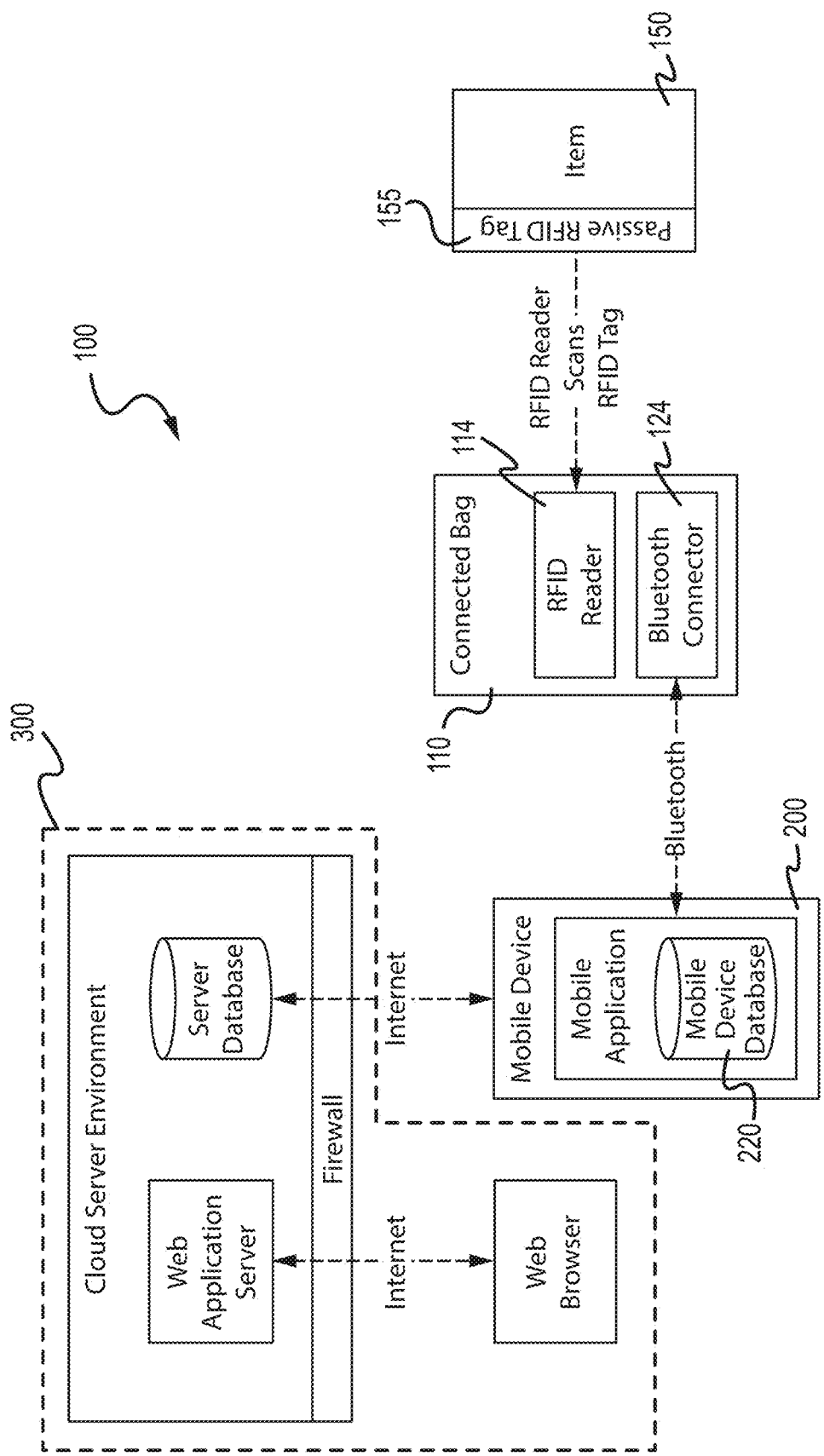
FIG. 17 is an alternate block diagram of an embodiment of a system according to the present invention.

FIG. 17 is a diagrammatic representation of a system 100 according to the present invention, similar to that of FIG. 1. FIG. 17 further depicts a mobile device datastore in the form of a mobile device database 220, which may be populated from an external data source 300 upon a successful user login, as described above. Further, FIG. 17 identifies a possible external data source 300 comprising a cloud server arrangement, including its own datastore and network access capabilities.

The foregoing is illustrative only of the principles of embodiments according to the present invention. Modifications and changes may occur to those skilled in the art, so it is not desired to limit the invention to the exact disclosure herein provided. For instance, the display or interface naming conventions used herein are not limiting. Further, while a primary embodiment has been described as utilizing a database resident in memory on a mobile electronic device separate and apart from a container, it is to be understood that a respective schedule or container configuration could be pushed to a particular container and the event information and status may be displayed on the container, itself, such as through a user interface provided thereon. While the preferred embodiment has been described, the details may be changed without departing from the invention, which is defined by the claims.

We claim:

1. A method for packing objects in a container, the method comprising steps of:
providing a container;
providing a code reader associated with the container;
providing a microcontroller;
providing a memory storage accessible to the microcontroller;
programming a conditional factor stored within the memory storage;
storing an expected object list in the memory storage;
associating the expected object list with the conditional factor;
identifying a scheduled event;
associating the conditional factor with the scheduled event;
providing an object;
providing a code associated with the object, the code being recognizable by the code reader;
recognizing the code of the object within the container;
assembling a packed object list comprising the object for which the code associated with the object was recognized by the code reader;
comparing the expected object list with the packed object list; and
notifying a user when the packed object list is at least one of
(a) the same as the expected object list, and
(b) is not the same as the expected object list.

2. The method of claim 1 further comprising the steps of:
providing a handheld electronic device with a user interface display capable of communications with the code reader;
pairing the handheld electronic device with the code reader;
providing a status indicator of the communication between the handheld electronic device and the code reader on the handheld electronic device; and
displaying at least one of the conditional factor, the expected object list, or the packed object list on the user interface display.

3. The method of claim 2, wherein the communications comprise wireless communications.

4. The method of claim 2, wherein the user interface display is presented through a capacitive touch screen capable of receiving input from a touch of a human finger.

5. The method of claim 2, wherein the status indicator is a color comprises a first color when the handheld electronic device is contemporaneously not in communication with the code reader;
the color comprises a second color when the handheld electronic device is contemporaneously in communication with the code reader and the code has not been recognized by the code reader; and
the color comprises a third color when the handheld electronic device is contemporaneously in communication with the code reader and the code has been recognized by the code reader.

6. The method of claim 5, wherein the first, second and third colors are distinct colors.

7. The method of claim 5, wherein the first color is red.

8. The method of claim 5, wherein the second color is selected from the group consisting of yellow and orange.

9. The method of claim 5, wherein the third color is green.

10. The method of claim 1 further comprising the step of regenerating the packed object list.

11. The method of claim 10, wherein the regeneration of the packed object list is automatic after a predetermined delay time.

12. The method of claim 1, wherein the conditional factor is an event type.

13. The method of claim 1, wherein the conditional factor is an event location.

14. The method of claim 1, wherein the container is selected from the group consisting of: a backpack, a briefcase, a purse, a sports duffel bag, and a suitcase.

15. The method of claim 1, wherein the code reader comprises a radio frequency identification (RFID) reader.

16. The method of claim 15, wherein the code comprises a radio frequency identification (RFID) code.

17. The method of claim 1, wherein the code reader is physically secured to the container.

* * * * *